United States Patent
Fang et al.

(10) Patent No.: US 9,917,524 B2
(45) Date of Patent: Mar. 13, 2018

(54) ENERGY CHANNELLING SINGLE STAGE POWER CONVERTER

(71) Applicant: Queen's University at Kingston, Kingston (CA)

(72) Inventors: Peng Fang, Kingston (CA); Yan-Fei Liu, Kingston (CA)

(73) Assignee: Queens' University at Kingston, Kingston, ON (CA)

( * ) Notice: Subject to any disclaimer, the term of this patent is extended or adjusted under 35 U.S.C. 154(b) by 0 days.

(21) Appl. No.: 15/508,525

(22) PCT Filed: Sep. 3, 2015

(86) PCT No.: PCT/CA2015/000484
§ 371 (c)(1),
(2) Date: Mar. 3, 2017

(87) PCT Pub. No.: WO2016/033681
PCT Pub. Date: Mar. 10, 2016

(65) Prior Publication Data
US 2017/0288557 A1    Oct. 5, 2017

Related U.S. Application Data

(60) Provisional application No. 62/046,218, filed on Sep. 5, 2014.

(51) Int. Cl.
*H02M 1/15* (2006.01)
*H02M 3/335* (2006.01)
(Continued)

(52) U.S. Cl.
CPC .......... *H02M 3/33576* (2013.01); *H02M 1/15* (2013.01); *H02M 1/4258* (2013.01); *H05B 33/0815* (2013.01)

(58) Field of Classification Search
CPC ........ H02M 1/14; H02M 1/15; H02M 1/4258; H02M 3/33507; H02M 3/33569; H02M 3/33576; H05B 33/0808; H05B 33/0815
See application file for complete search history.

(56) References Cited

U.S. PATENT DOCUMENTS 7,323,827 B2 * 1/2008 Nerone ................... H02M 1/15
                                              315/247
8,446,134 B2 * 5/2013 Manor .................... H02M 1/14
                                              323/222

(Continued)

*Primary Examiner* — Matthew Nguyen
(74) *Attorney, Agent, or Firm* — Stephen J. Scribner

(57) ABSTRACT

Energy channelling AC-DC converters, methods, and control systems are provided. The converters comprise a first output circuit that receives power from the input circuit and provides a first output comprising a DC voltage with a first AC voltage ripple or a DC current with a first AC current ripple; a second output circuit that receives power from the input circuit and provides a second output comprising a second AC voltage ripple or a second AC current ripple, the second output circuit having one or more power switching device; and a controller that controls the power switching devices of the input circuit and the second output circuit so that the first output circuit and the second output circuit alternatively rectify output current only once during one switching cycle of the power switching devices; wherein the first output and the second output are connected together (i) in series, such that the first AC voltage ripple is substantially cancelled, or (ii) in parallel, such that the first AC current ripple is substantially cancelled; wherein substantially ripple-free DC output power is provided.

19 Claims, 45 Drawing Sheets

(51) Int. Cl.
*H02M 1/42* (2007.01)
*H05B 33/08* (2006.01)

(56) References Cited

U.S. PATENT DOCUMENTS

2008/0285316 A1* 11/2008 Park .................. H02M 1/15
                                                363/50
2017/0033678 A1*  2/2017 Park .................. H02M 1/143

* cited by examiner $G_{Q3}$ is constant off
When Vo2 > 0

$G_{Q2}$ is constant off
When Vo2 < 0

$G_{Q3}$ is constant off
When Vo2 > 0

$G_{Q2}$ is constant off
When Vo2 < 0

| $G_{Q3}$ is constant off | $G_{Q2}$ is constant off |
| When Vo2 > 0 | When Vo2 < 0 |

ENERGY CHANNELLING SINGLE STAGE POWER CONVERTER

RELATED APPLICATION

This application claims the benefit of the filing date of U.S. Application No. 62/046,218, filed on 5 Sep. 2014, the contents of which are incorporated herein by reference in their entirety.

FIELD

The invention relates to an energy channeling single-stage AC-DC converter and control method therefor. The converter achieves a high power factor at the AC input side while producing a substantially ripple-free DC output. In addition, the converter achieves true single stage power conversion. The converter is a cost effective solution for applications requiring high power factor and ripple-free DC output, such as in LED driving applications where high power factor and high quality DC current output are critical.

BACKGROUND

For a conventional single-stage AC-DC converter with high power factor, the output voltage usually contains a low frequency (twice line frequency) ripple component, due to imbalance of input and output power. This second harmonic (e.g., 120 Hz in North America or 100 Hz in China,. Europe) is of particular concern for DC lighting applications, such as LED lighting, as it results in visible flickering wherein the human eye can see fluctuation of the light emitting from the LED.

FIG. 1 shows a conventional single-stage flyback converter, typically used in medium to low power applications such as driving LEDs. The low frequency ripple of the output voltage is usually significant and results in a ripple in the LED current, which produces fluctuating light output, which may be undesirable in certain lighting applications, as well as harmful to human eyes.

In order to solve this problem, a two-stage AC-DC converter may be used to produce ripple-free DC output while maintaining a high power factor at the AC side. FIG. 2 shows such a two-stage AC-DC converter used to drive LEDs. The first power stage is a boost converter used to achieve a high power factor. The output voltage of the Boost converter is usually high, e.g., 380 VDC, which must be lowered to drive most loads. The second stage is a DC-DC converter used to step down output voltage and produce the final DC output. The DC-DC converter can be implemented with different topologies such as buck, flyback, LLC, etc. In some cases, the first stage power factor correction can also be implemented with a flyback converter as shown in FIG. 3. However, in general, the addition of the second stage has drawbacks such as reduced efficiency and higher component count and associated cost.

SUMMARY

According to a first aspect there is provided a converter that converts AC input into DC output power, comprising: an input circuit that receives AC input power, the input circuit having one or more power switching device; a first output circuit that receives power from the input circuit and provides a first output comprising a DC voltage with a first AC voltage ripple or a DC current with a first AC current ripple; a second output circuit that receives power from the input circuit and provides a second output comprising a second AC voltage ripple or a second AC current ripple, the second output circuit having one or more power switching device; a controller that controls the power switching devices of the input circuit and the second output circuit so that the first output circuit and the second output circuit alternatively rectify output current only once during one switching cycle of the power switching devices; wherein the first output and the second output are connected together (i) in series, such that the first AC voltage ripple is substantially cancelled, or (ii) in parallel, such that the first AC current ripple is substantially cancelled; wherein substantially ripple-free DC output power is provided. In some embodiments, the first output circuit may comprise one or more power switching device.

The converter may comprise at least one magnetic energy storage device, wherein: the controller controls the power switching devices so that energy from the magnetic energy storage device is divided between the first and second output circuits, such that: the first output circuit receives power released from the magnetic energy storage device during a part of the switching cycle, and the second output circuit receives power released from the magnetic energy storage device during a different part of the switching cycle.

The converter may comprise a flyback converter, a buck-boost converter, a non-isolated boost converter, or LCLC resonant converter.

In one embodiment, the at least one magnetic energy storage device comprises a transformer; the first output circuit includes a first secondary transformer winding Nsec1 and provides a first output voltage Vo1; the second output circuit includes a second secondary transformer winding Nsec2 and provides a second output voltage Vo2; and a turns ratio of the first and second secondary transformer windings Nsec1:Nsec2 is less than a ratio of the first and second output voltages Vo1:Vo2.

In another embodiment, the at least one magnetic energy storage device comprises an inductor; the first output circuit includes a first inductor winding N1 and provides a first output voltage Vo1; the second output circuit includes a second inductor winding N2 and provides a second output voltage Vo2; and a turns ratio of the first and second inductor windings N1:N2 is less than the ratio of the first and second output voltages Vo1:Vo2.

The converter may comprise an auxiliary power supply that provides input power that maintains the second output when the AC input power falls below a threshold value. The auxiliary power supply may comprise an auxiliary winding of the magnetic energy storage device that provides input power that maintains the second output when the AC input power falls below a threshold value.

The controller may control the one or more power switching device of the input circuit so that the input circuit achieves a high power factor.

Another aspect provides a method of converting AC input into DC output power, comprising: receiving AC input power using an input circuit having one or more power switching device; using a first output circuit to receive power from the input circuit and provide a first output comprising a DC voltage with a first AC voltage ripple or a DC current with a first AC current ripple; using a second output circuit to receive power from the input circuit and provide a second output comprising a second AC voltage ripple or a second AC current ripple, the second output circuit having one or more power switching device; controlling the power switching devices of the input circuit and the second output circuit so that the first output circuit and the second output circuit alternatively rectify output current only once during one switching cycle of the power switching devices; wherein the first output and the second output are connected together (i) in series, such that the first AC voltage ripple is substantially cancelled, or (ii) in parallel, such that the first AC current ripple is substantially cancelled; wherein substantially ripple-free DC output power is provided.

The method may comprise using at least one magnetic energy storage device; controlling the power switching devices so that energy from the magnetic energy storage device is divided between the first and second output circuits, such that: the first output circuit receives power released from the magnetic energy storage device during a part of the switching cycle, and the second output circuit receives power released from the magnetic energy storage device during a different part of the switching cycle.

The method may include using a power converter comprising a flyback converter, a buck-boost converter, a non-isolated boost converter, or a LCLC resonant converter.

In one embodiment the method comprises using a transformer for the at least one magnetic energy storage device, wherein: the first output circuit includes a first secondary transformer winding Nsec1 and provides a first output voltage Vo1; the second output circuit includes a second secondary transformer winding Nsec2 and provides a second output voltage Vo2; and selecting a turns ratio of the first and second secondary transformer windings Nsec1:Nsec2 to be less than a ratio of the first and second output voltages Vo1:Vo2.

In another embodiment the method comprises using an inductor for the at least one magnetic energy storage device, wherein: the first output circuit includes a first inductor winding N1 and provides a first output voltage Vo1; the second output circuit includes a second inductor winding N2 and provides a second output voltage Vo2; and selecting a turns ratio of the first and second inductor windings N1:N2 to be less than the ratio of the first and second output voltages Vo1:Vo2.

The method may comprise providing auxiliary input power that maintains the second output when the AC input power falls below a threshold value. One embodiment comprises using an auxiliary winding of the magnetic energy storage device to provide auxiliary input power that maintains the second output when the AC input power falls below a threshold value. The method may include setting a value of an auxiliary input voltage to be equal to a threshold input voltage.

The method may comprise controlling an input circuit current so that instantaneous input power is equal to or greater than output power of the second output.

The method may comprise controlling the one or more power switching device of the input circuit so that the input circuit achieves a high power factor.

According to another aspect, a controller for an AC-DC converter is provided, wherein converter comprises an input circuit that receives AC input power, the input circuit having one or more power switching device; a first output circuit that receives power from the input circuit and provides a first output comprising a DC voltage with a first AC voltage ripple or a DC current with a first AC current ripple; and a second output circuit that receives power from the input circuit and provides a second output comprising a second AC voltage ripple or a second AC current ripple, the second output circuit having one or more power switching device; wherein substantially ripple-free DC output power is provided when the first output and the second output are connected together (i) in series, such that the first AC voltage ripple is substantially cancelled, or (ii) in parallel, such that the first AC current ripple is substantially cancelled; wherein the controller controls switches of the of the input circuit and the second output circuit such that the first output circuit and the second output circuit alternatively rectify output current only once during one switching cycle of the power switching devices.

In one embodiment, the controller comprises a circuit that receives a sensed low frequency ripple of the first output and produces a reference signal having a ripple opposite in phase to the low frequency ripple; a comparator that uses the reference signal to produce a switching signal for the one or more switches of the second output circuit; a circuit that produces a switching signal for the one or more power switching device of the input circuit, such that timing of switching of the power switching devices of the input circuit and the second output circuit result in the first output circuit and the second output circuit alternatively rectifying output current only once during one switching cycle of the power switching devices.

BRIEF DESCRIPTION OF THE DRAWINGS

For a better understanding of the invention, and to show more clearly how it may be carried into effect, embodiments will be described, by way of example, with reference to the accompanying drawings, wherein.

DETAILED DESCRIPTION OF EMBODIMENTS

According to a broad aspect, the invention provides a single-stage AC-DC converter with high power factor that produces a DC output that is substantially low frequency ripple-free. The term "low frequency ripple" is intended to refer to the second harmonic of the AC input power (e.g., 120 Hz in North America or 100 Hz in China, Europe). Accordingly, embodiments described herein are particularly useful for DC lighting applications, such as LED lighting, as they reduce or eliminate visible flickering of the light emitting from the LED. Thus, in this context the term "substantially" refers to the fact that the converter produces DC power with only very small low frequency ripple or no low frequency ripple, such that the DC power is suitable for use in sensitive applications such as LED lighting. However, embodiments may be used in applications other than driving LEDs. Thus, throughout the description and drawings, the load may include one or more LEDs, or the load may not include any LEDs. In lighting applications, embodiments may be implemented in a LED lamp, or in a separate power supply used to drive one or more lamps.

Figure 1:
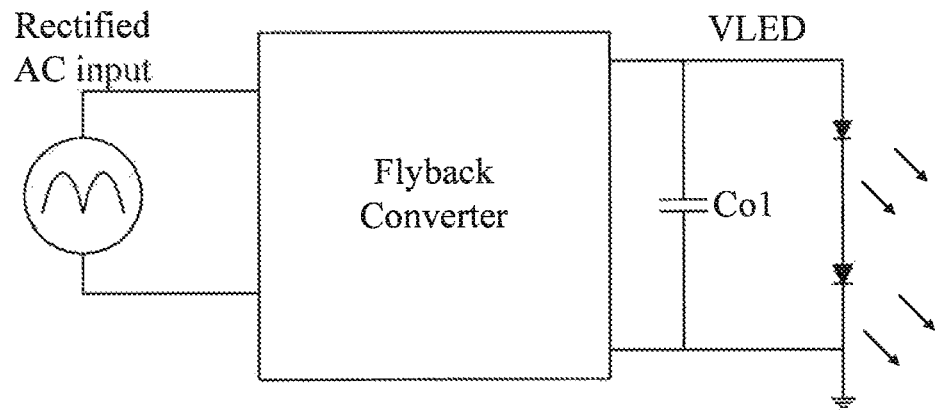
FIG. 1 shows a conventional single-stage flyback converter used to drive LEDs.
Figure 2:
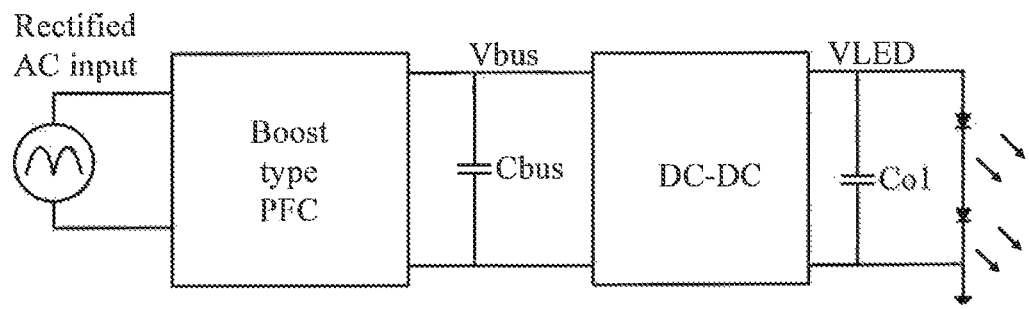
FIG. 2 shows a conventional two-stage converter used to drive LEDs.
Figure 3:
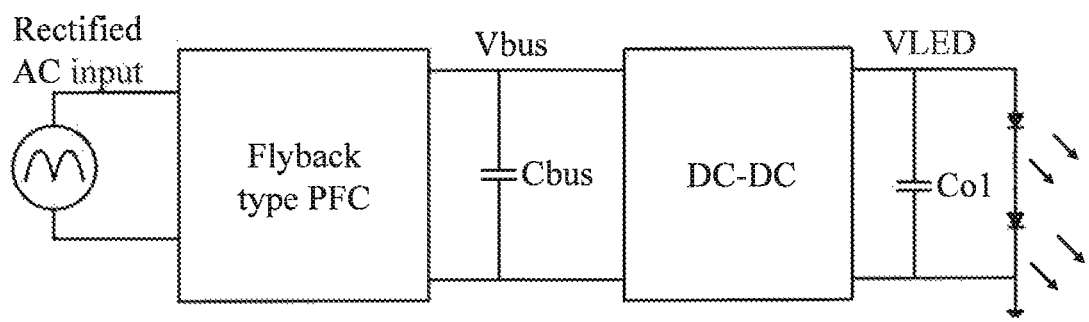
FIG. 3 shows a conventional two-stage converter used to drive LEDs.
Figure 4A:
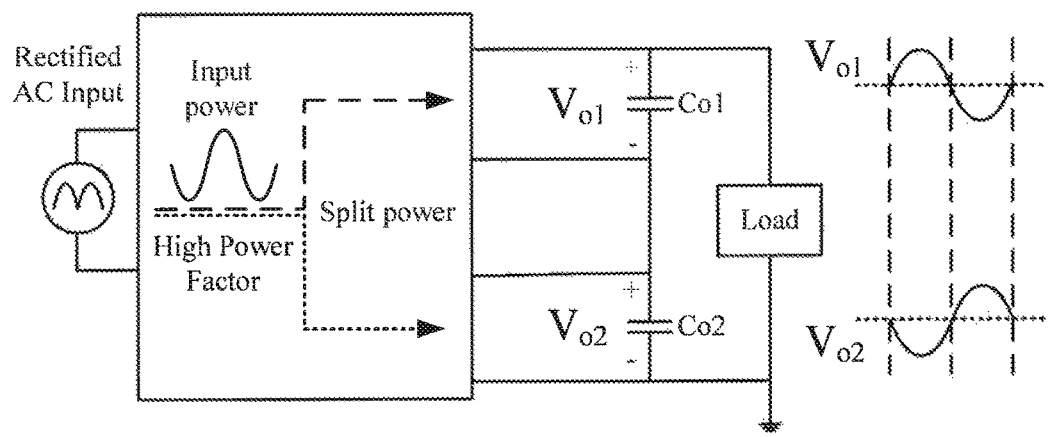
FIGS. 4A and 4B are generalized diagrams of embodiments described herein.
Figure 4B:
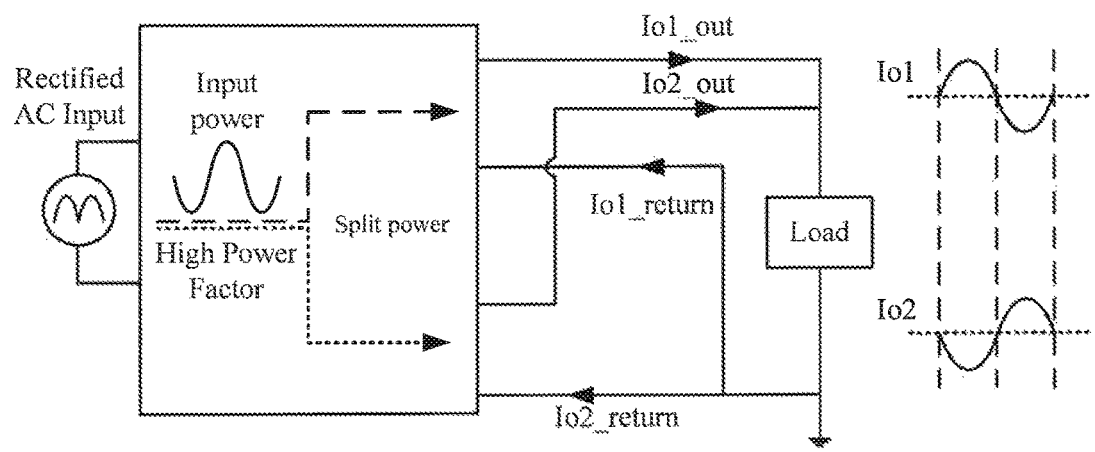

The embodiments combine the advantages of conventional single-stage and two-stage converters. Generalized diagrams of a voltage-based and current-based single-stage AC-DC converter embodiments of the invention are shown in FIGS. 4A and 4B. In order to achieve a high power factor, the sinusoidal input power is split into at least two components, referred to herein as "energy channeling", The first component, shown as the upper component in FIG. 4A, is used to produce output voltage $V_{o1}$, and the second component, shown as the lower component in FIG. 4A, is used to produce output voltage $V_{o2}$. These two output voltages are connected in series. The voltage $V_{o2}$ is controlled such that it contains a low frequency ripple voltage which is opposite in phase and equal in magnitude to that of $V_{o1}$. Therefore, the low frequency ripple of $V_{o1}$, $V_{o1\_rip}$, and the low frequency ripple of $V_{o2}$, $V_{o2\_rip}$, substantially cancel each other and the sum of $V_{o1}$ and $V_{o2}$, $V_{LOAD}$, is a low frequency ripple-free DC voltage. The term "substantially cancel" is intended to mean that the low frequency ripple is completely cancelled or is reduced to a very small ripple such that the output DC power is acceptable for use in applications that are sensitive to the low frequency ripple, such as LED lighting applications. For example, the peak ripple voltage may be less than 5%, or less than 2%, of the DC output voltage ($V_{LOAD}$), and the peak ripple current may be less than 10%, or less than 5%, of the DC output current ($I_{LOAD}$). It will be appreciated that, since the power has only been converted once, single stage power conversion is achieved while producing a low frequency ripple-free DC output.

Of course, the above-mentioned at least two components of the sinusoidal input power may also be used to produce currents $I_{o1}$ and $I_{o2}$, which are connected in parallel as shown in FIG. 4B. The current $I_{o2}$ is controlled to contain a low frequency current ripple which is opposite in phase and equal in magnitude to that of $I_{o1}$. Therefore, the low frequency ripple of $I_{o1}$, $I_{o1\_rip}$, and the low frequency ripple of $I_{o2}$, $I_{o2\_rip}$, cancel each other and the sum of $I_{o1}$ and $I_{o2}$, $I_{LOAD}$, is a low frequency ripple-free DC current. As implementations in voltage (e.g., FIG. 5A) or current (e.g., FIG. 5B) are straight-forward to one of ordinary skill in the art, further description will pertain to voltage embodiments, with the understanding that they may easily be adapted to current embodiments, Embodiments described herein employ at least one maanetic energy storage device, such as a transformer or an inductor, that stores and releases energy. Embodiments control the storing and releasing of energy during one switching cycle. For example, a flyback transformer of a flyback converter and a buck-boost inductor of a buck-boost converter are magnetic energy storage devices, A magnetic energy storage device may have one or more winding, e.g., N1, N2, etc. When the device is a transformer, it may have one or more primary winding (Npri1, Npri2, etc.) and one or more secondary winding (Nsec1, Nsec2, etc). A turns ratio may be expressed herein generally as N1:N2, or more specifically as, e.g., Nsec1:Nsec2 in the case of transformer secondary windings.

Figure 5A:
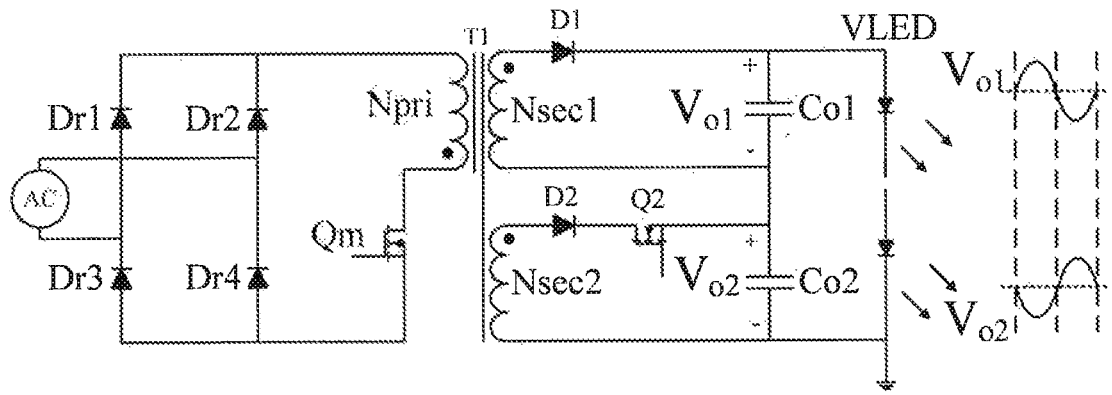
FIGS. 5A, 5B, and 5C are diagrams of a flyback converter embodiments driving an LED load.
Figure 5B:
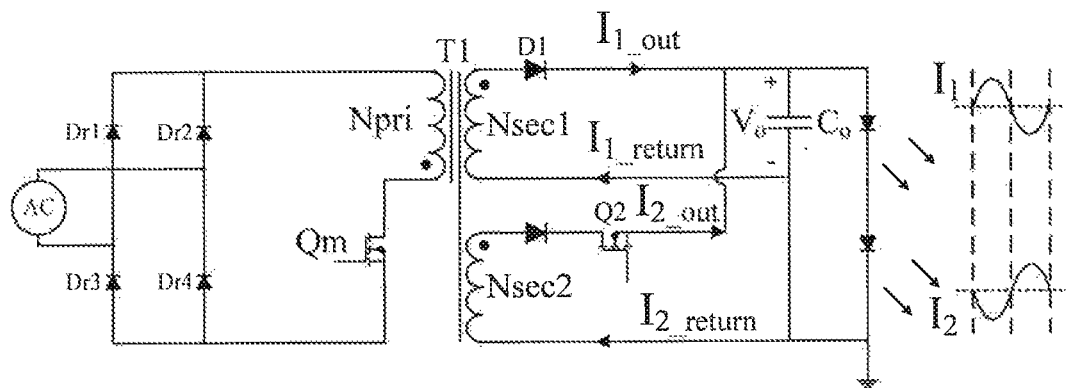
Figure 5C:
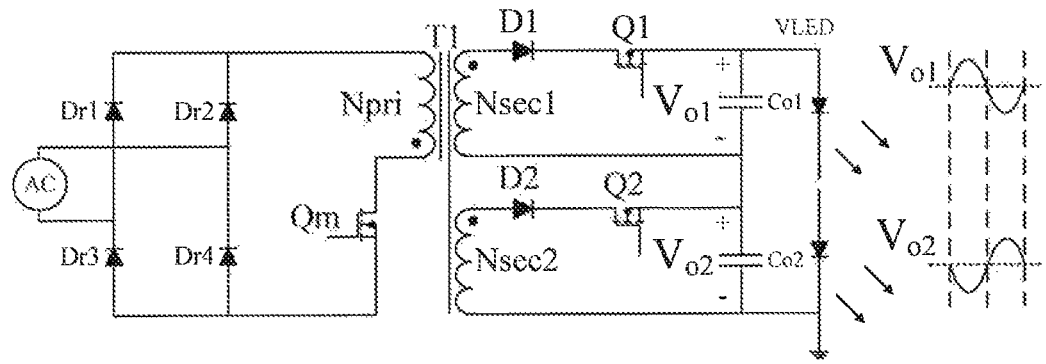
Figure 6:
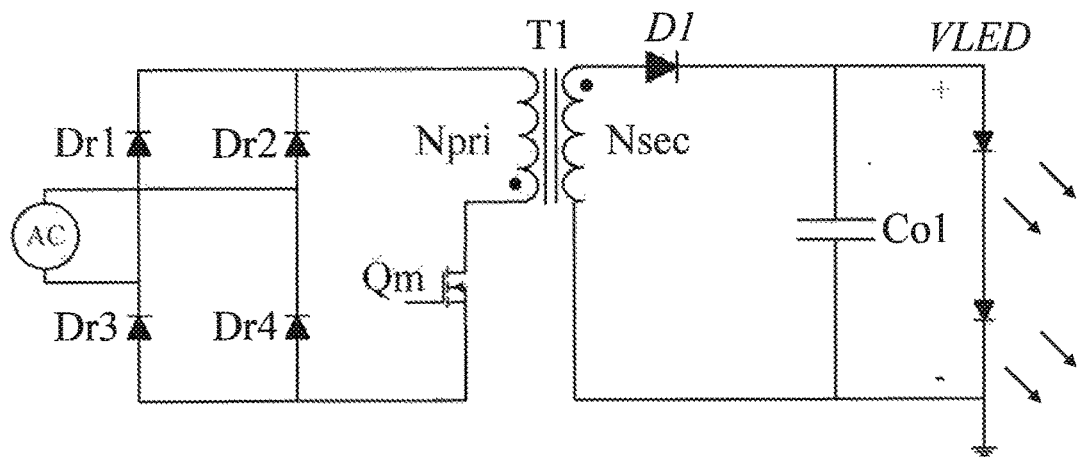
FIG. 6 is a circuit diagram of the conventional flyback converter of FIG. 1.

FIGS. 5A and 5B show voltage and current embodiments based on a flyback converter, FIG. 5C shows an embodiment wherein the first output circuit includes a power switching device, and FIG. 6 shows a conventional flyback converter. Referring to FIG. 5A, circuit elements including a winding Nsec2, a diode D2, a MOSFET Q2, and a capacitor Co2 that form a second circuit that produces the ripple cancellation voltage $V_{o2}$. In this embodiment the polarity of winding Nsec2 and diode D2 are oriented for flyback configuration, and Q2 is oriented accordingly so that its anti-parallel body diode will not be turned on when the converter is operating in flyback mode. Thus, as can be seen from FIG. 5A, the converter is a true single-stage converter. The same can be seen for the current version shown in FIG. 5B.

Figure 7:
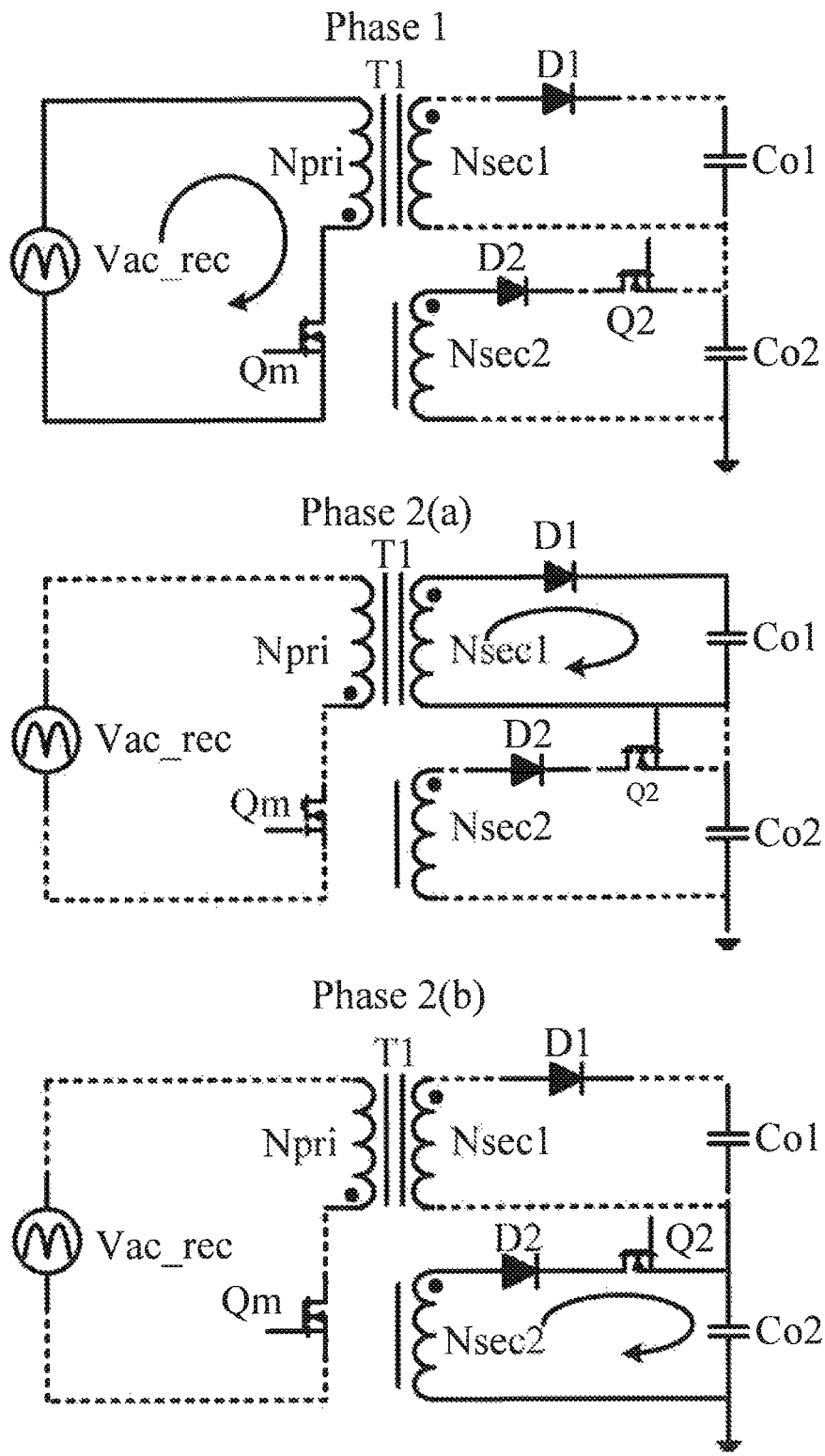
FIG. 7 shows power transfer phases of energy channelling in a flyback converter embodiment.

FIG. 7 illustrates operation of the power stage of a flyback implementation and shows how the converter achieves single stage power conversion. In one switching cycle, the power conversion process can be divided into two phases. Referring to FIG. 7, phase 1 is the energy storage phase, where energy is taken from the AC power source and is stored in the flyback transformer. During the energy transfer phase, the energy stored in the flyback transformer is transferred to the output capacitors and the load. The energy transfer phase is further divided into phase 2(a) and phase 2(b). In phase 2(a), the transformer energy is transferred to the output capacitor Co1 and the load. In phase 2(b), the transformer energy is transferred to the output capacitor Co2 and the load. The sequence of phase 2(a) and phase 2(b) may be swapped if required by design.

Although the energy transfer is divided into phases 2(a) and 2(b), each energy storage element (the magnetizing inductors Nsec1 and Nsec2, and output capacitors Co1 and Co2) stores energy from the input side only once, and releases the stored energy to the load only once, during one switching cycle. That is, the input energy is processed only one time. Therefore, the converter achieves single-stage AC to DC conversion.

Figure 8:
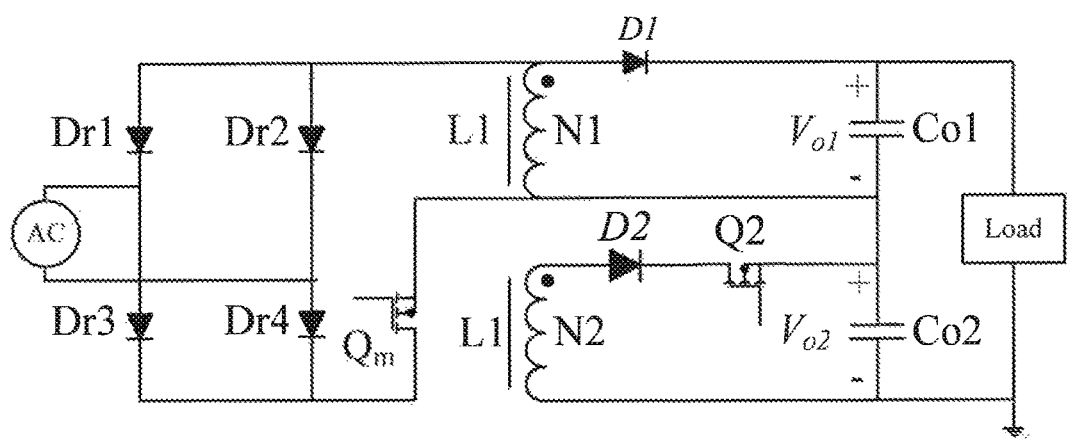
FIG. 8 is a diagram of a buck-boost implementation according to an embodiment.
Figure 9:
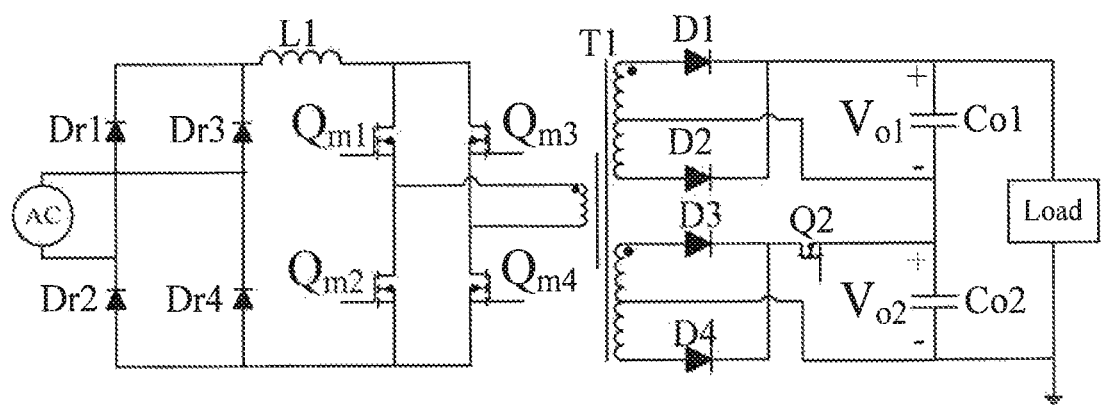
FIG. 9 is a diagram of an isolated boost implementation according to an embodiment.
Figure 10:
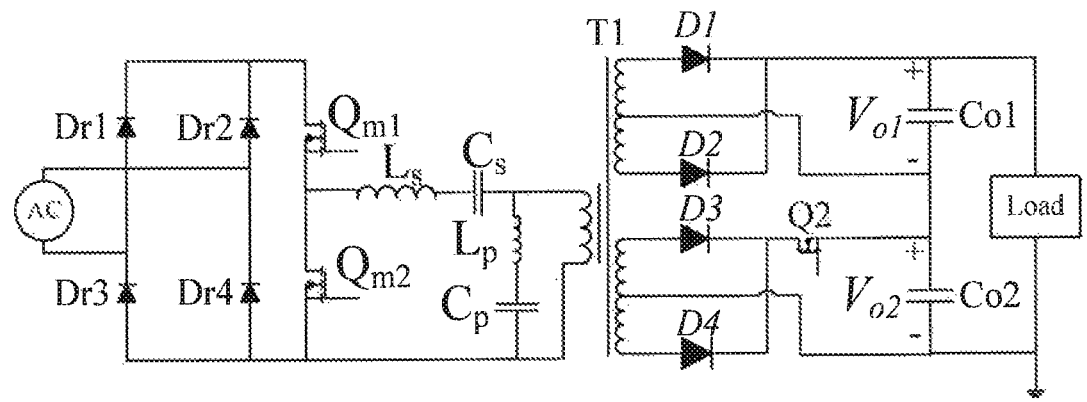
FIG. 10 is a diagram of an LCLC implementation according to an embodiment.

An energy channelling converter based on the concepts described herein may also implemented with any other current-fed output type converter topology. Examples include, but are not limited to, buck-boost converter, non-isolated boost converter, and LCLC resonant converter. Embodiments based on such topologies are described below, Suitable topologies may achieve high power factor at AC side and produce a current-fed output, e.g., where a capacitor is used as an output filter. For example, FIGS. 8-10 show buck-boost converter, isolated boost converter, and LCLC resonant implementations, respectively. The embodiments enable simple, cost effective, true single-stage circuit implementations that produce a low frequency ripple-free DC output voltage while maintaining high power factor.

In the embodiment of FIG. 5A, the turns ratio Nsec1: Nsec2 of transformer T1 is designed to meet the requirement of Nsec1:Nsec2<Vo1:'Vo2 to achieve energy channeling with only one MOSFET Q2. After the MOSFET Qm is turned off, the transformer energy only transfers to $V_{o1}$ when Q2 is not turned on. When Q2 is turned on, the transformer energy only transfers to $V_{o2}$.

As an example, the turns ratio Nsec1: Nsec2 is 8:2, while the voltage ratio $V_{o1}$:$V_{o2}$ is regulated at 45 V and 5 V ($V_{o1}$:$V_{o2}$=9:1), respectively. When Qm is turned off and Q2 is also off, D1 will be forced to conduct and the energy will go to output $V_{o1}$ through D1. When Q2 is turned on, the voltage across winding N2 is 5 V and because of the turns ratio relationship, the voltage across winding Nsec1 is 20 V. The diode D1 is reverse biased because $V_{o1}$ is regulated around 45 V. Therefore, current only circulates through winding Nsec2 and the transfortner energy only transfers to $V_{o2}$. By controlling the turn on time of Q2, the amount of energy transferred to $V_{o2}$ in every switching cycle is controlled. Therefore, $V_{o2}$ may be regulated to a desired value where it includes a DC voltage superimposed by a low frequency AC ripple voltage. The low frequency AC ripple voltage is controlled to be opposite in phase and equal in amplitude to the low frequency AC voltage of $V_{o1}$.

It is desirable to reduce the voltage stress and current stress of components such as the MOSFETs. For example, in the flyback converter embodiment of FIG. 5A, it is desirable to reduce the voltage stress and current stress of MOSFET Q2. The voltage and current stress of Q2 are closely related to the turns ratio Nsec1:Nsec2. When Nsec1:Nsec2 is higher, the current of winding Nsec2 will be higher so that the current stress on Q2 will be higher. On the other hand, the voltage stress of Q2 is increased when the turns ratio Nsec1:Nsec2 is reduced. When Q1 is off and D1 is conducting. (Q2 is not yet on), the voltage across Q2 equals to the difference between winding voltage VNsec2 and Vo2. The max voltage stress of Q2 is expressed by Equation (1):

$$v_{Q2\_max} = \frac{V_{o1\_max}}{\frac{N_{sec1}}{N_{sec2}}} - V_{o2\_min} \quad (1)$$

The above equation shows that when Nsec1:Nsec2 is reduced, the voltage stress of Q2 will be increased. Of course, design considerations over Q2 influence other circuit parameters such as switching frequency, inductance of the transformer, current stress of Qm, etc.

Switching Operation

Switching operation to achieve energy channeling will now be described in respect of a flyback implementation. However, the strategy may be extended to other topology implementations, such as, for example, buck-boost converter, isolated boost converter, and LCLC resonant converter topologies, as described herein, In FIG. 5A, when the main MOSFET Qm is on, the converter is drawing power from the AC power source. The transformer T1 is being charged through winding Npri and both D1 and D2 are reverse biased. The state of Q2 has no influence on the converter. When Qm is turned off, the flyback transformer energy is then transferred to output $V_{o1}$ and $V_{o2}$. When Q2 is not turned on, the flyback transformer energy is transferred to $V_{o1}$. When Q2 is turned on, the flyback transformer energy is transferred to $V_{o2}$.

Figure 11:
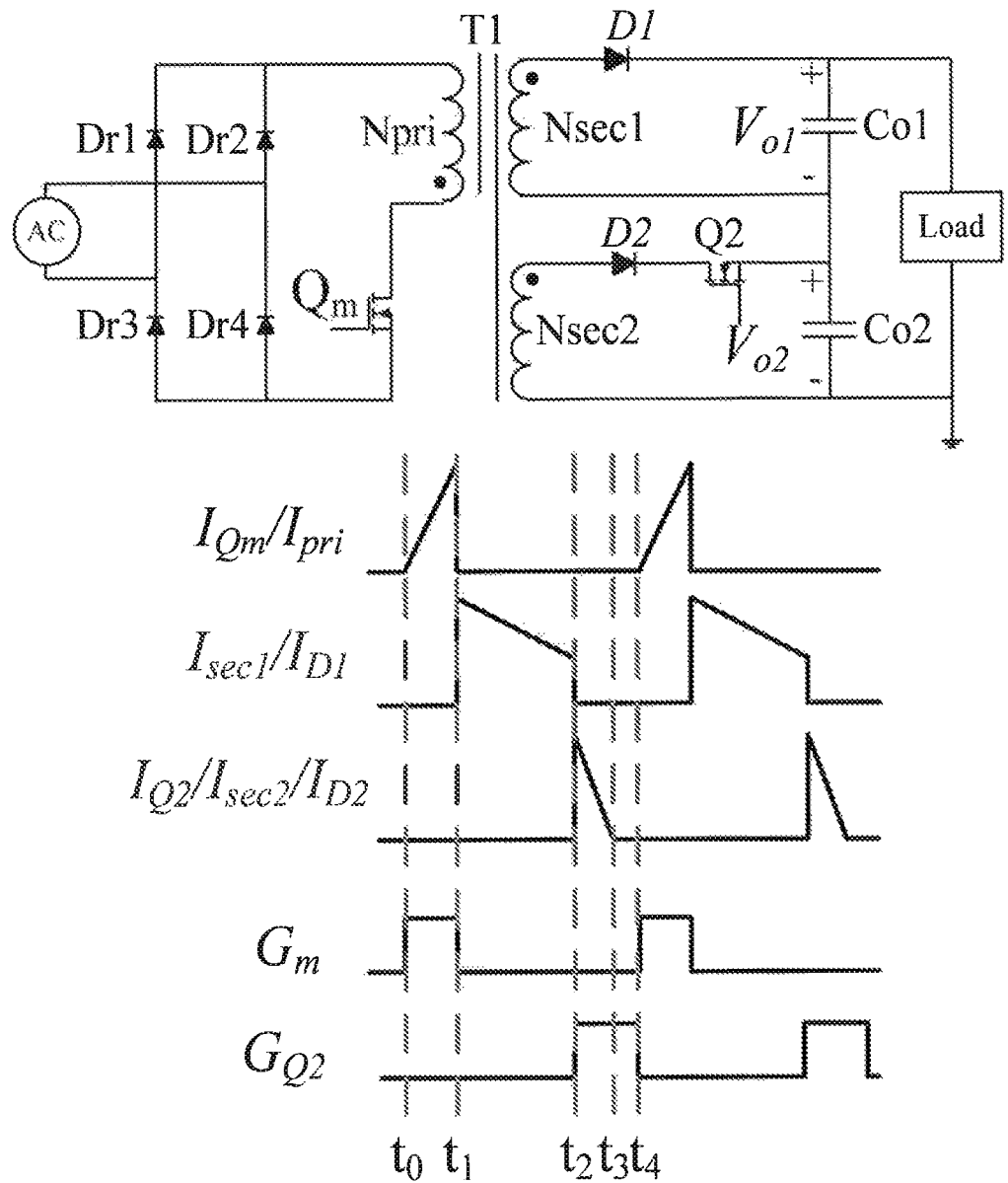
FIG. 11 shows a circuit diagram and a timing diagram for a flyback converter embodiment operating at DCM and. GQ2 under leading edge modulation.

FIG. 11 shows a circuit diagram and switching waveform of a flyback converter embodiment operating under discontinuous conduction mode (DCM) and with the gate driving signal GQ2 under leading edge modulation. It is assumed that the selection of Nsec1 and Nsec2, as well as $V_{o1}$ and $V_{o2}$, are such that when Q2 is turned on, D1 is reverse biased. A switching cycle starts at time $t_0$. Qm is turned on at to and the primary side current Ipri in the winding Npri starts increasing from zero. Qm is turned off at $t_1$ while Q2 is still off. The inductive current keeps flowing through D1 and transfers energy to $V_{o1}$, Q2 is turned on at $t_2$ under leading edge modulation. The inductive current commutes from winding Nsec1 to winding Nsec2 at $t_2$. By controlling the time to turn on Q2, the amount of the energy transferred to $V_{o2}$ is controlled in every switching cycle and therefore $V_{o2}$ regulation is achieved. The current in winding Nsec2 keeps decreasing and becomes zero at $t_3$. A new switching cycle doesn't start until $t_4$ to ensure DCM operation.

Figure 12:
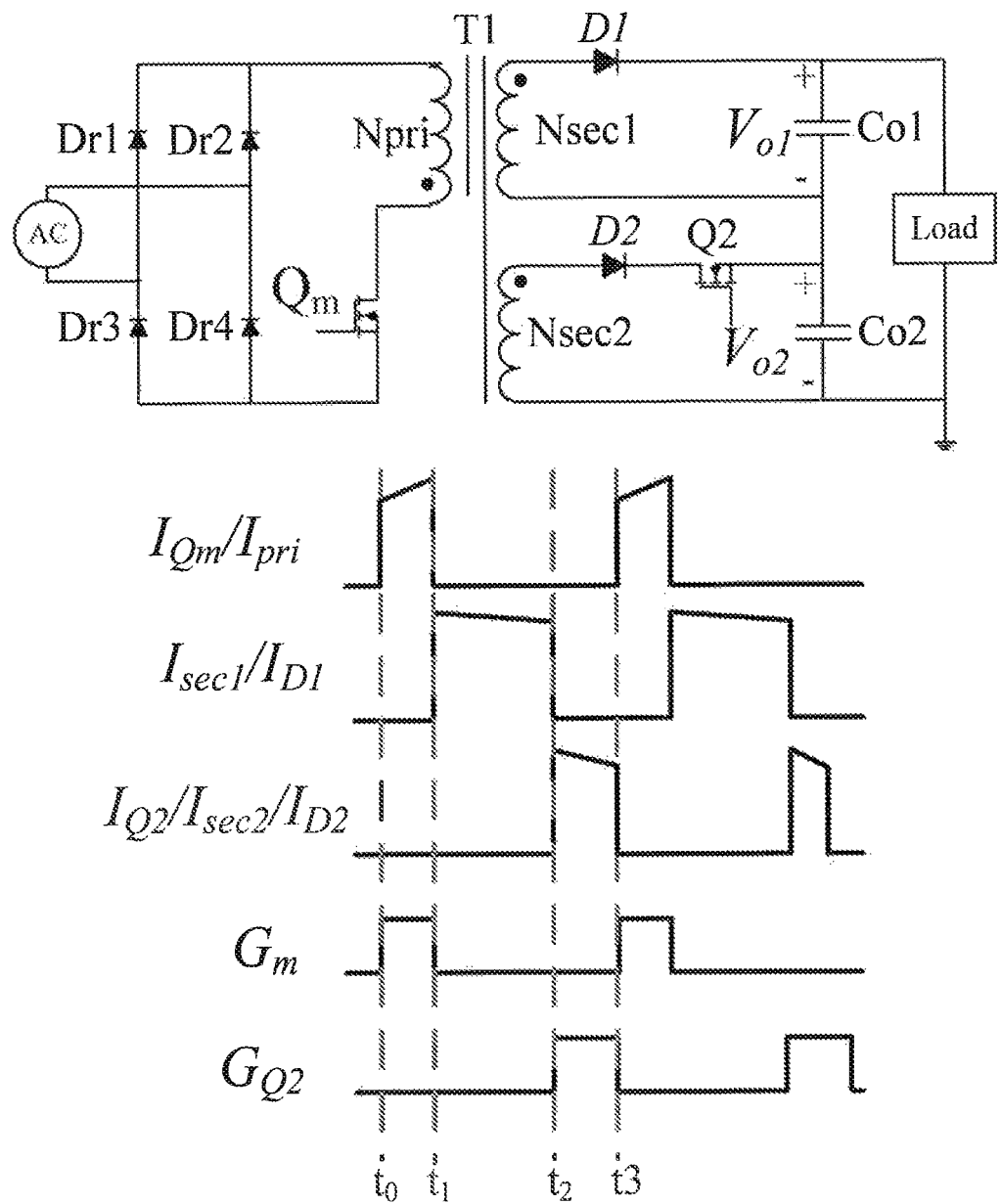
FIG. 12 shows a circuit diagram and a timing diagram for a flyback converter embodiment operating at CCM and GQ2 under leading edge modulation.
Figure 13:
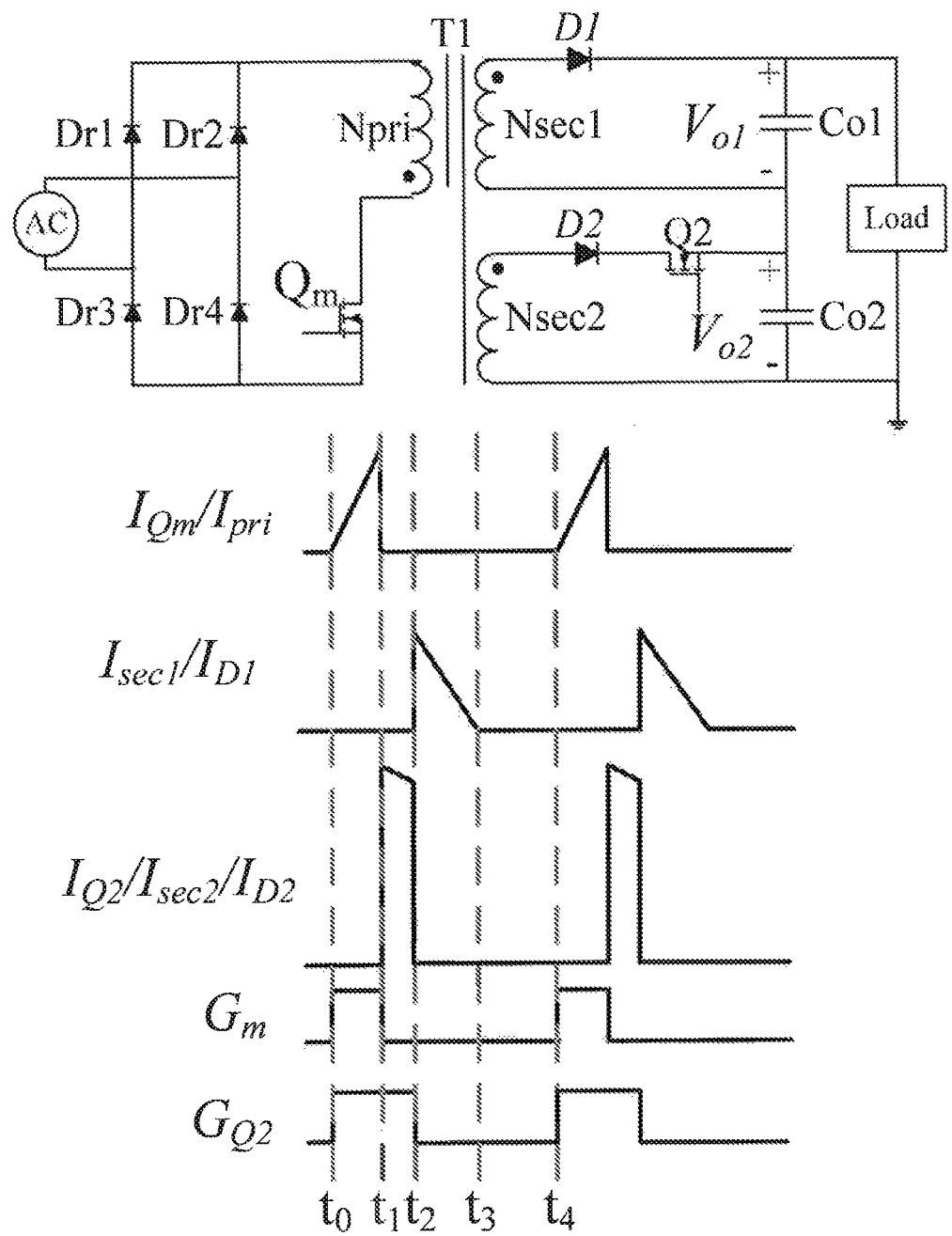
FIG. 13 shows a circuit diagram and a timing diagram for a flyback converter embodiment operating at DCM and. GQ2 under trailing edge modulation.
Figure 14:
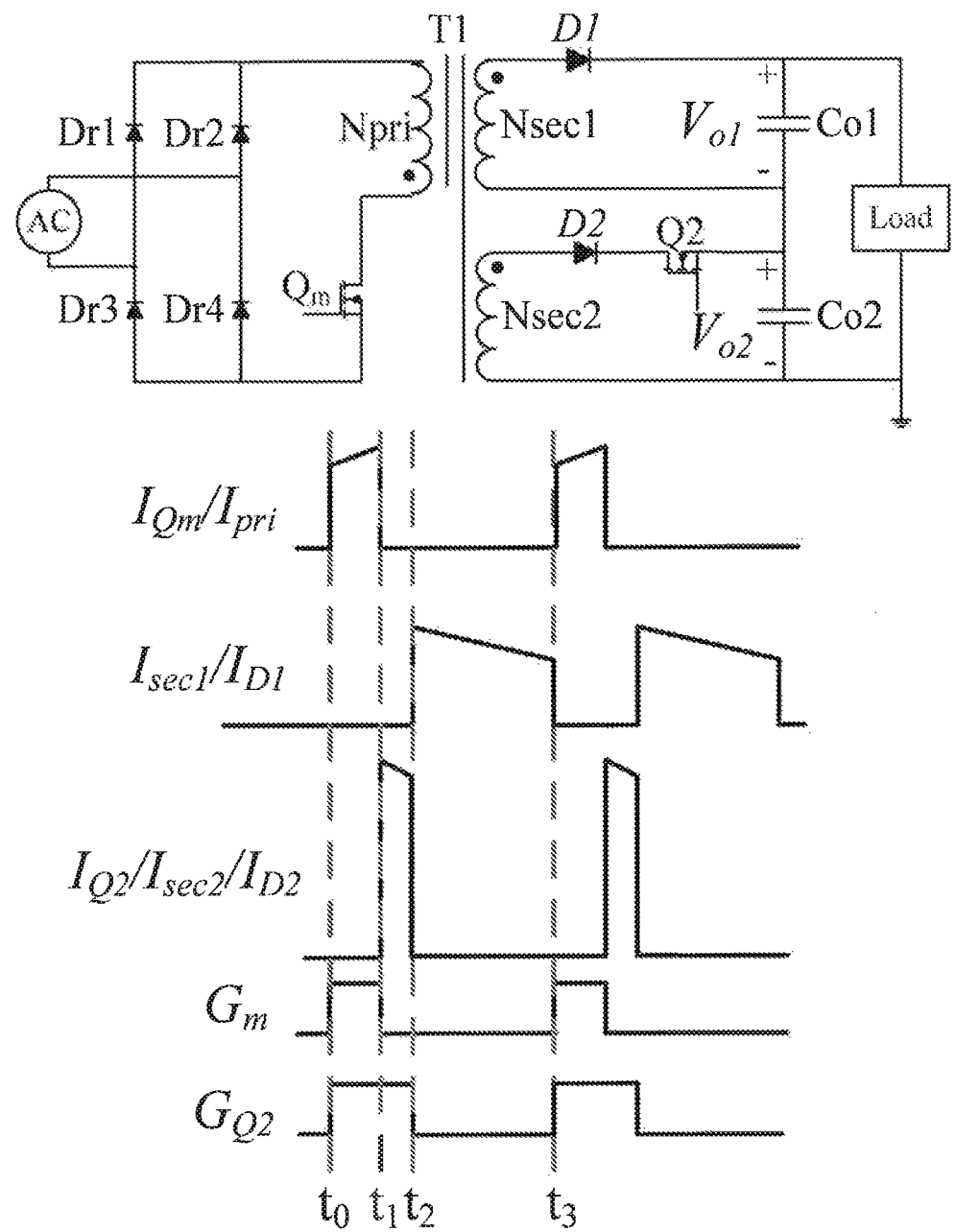
FIG. 14 shows a circuit diagram and a timing diagram for a flyback converter embodiment operating at CCM and C1Q2 under trailing edge modulation
Figure 15:
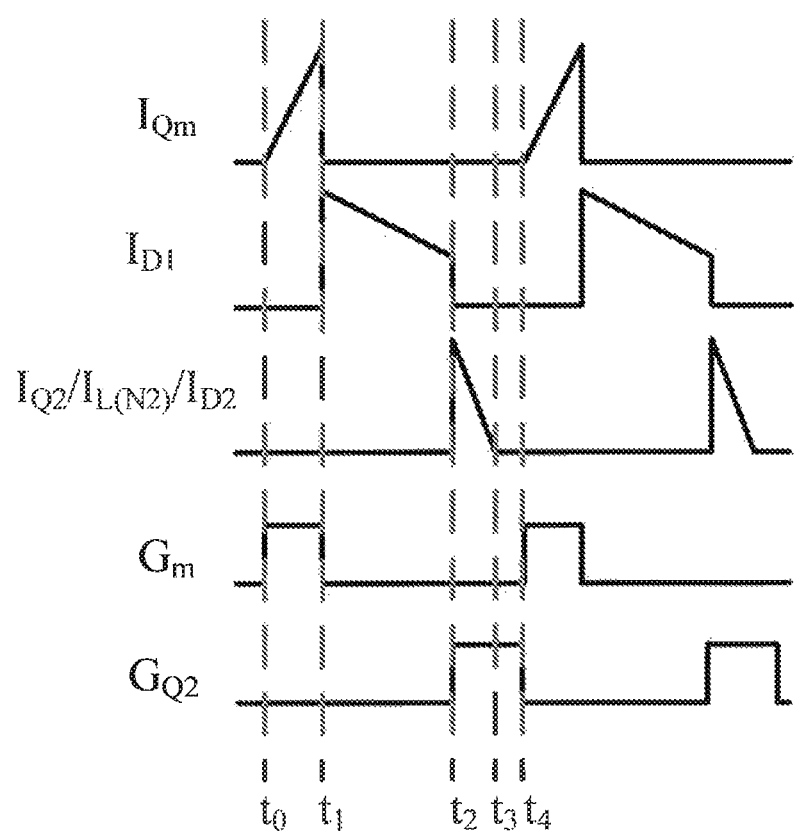
FIG. 15 shows a timing diagram for the buck-boost converter embodiment of FIG. 8 operating at DCM and GQ2 under leading edge modulation.
Figure 16:
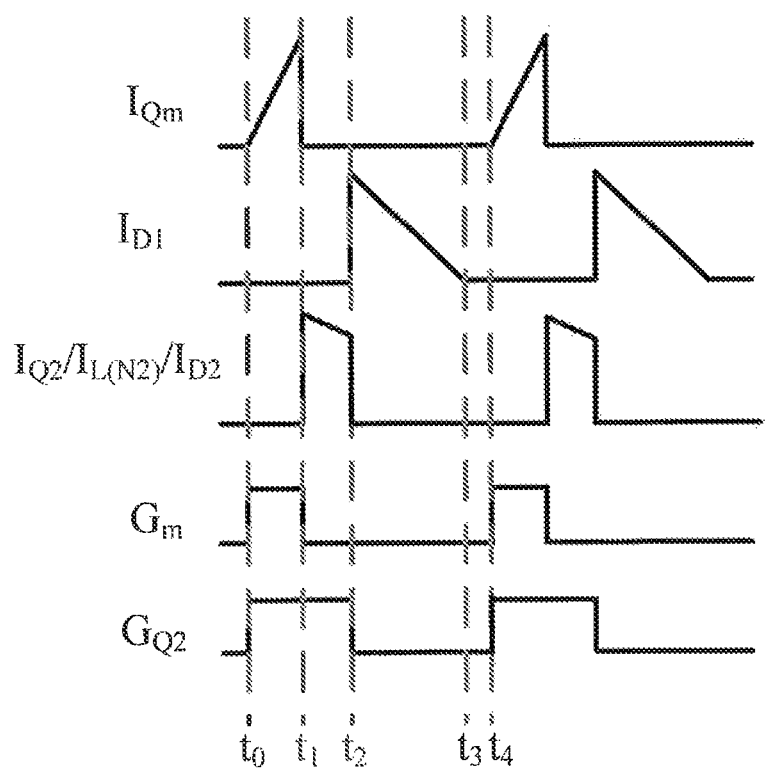
FIG. 16 shows a timing diagram for the buck-boost converter embodiment of FIG. 8 operating at DCM and GQ2 under trailing edge modulation.
Figure 17:
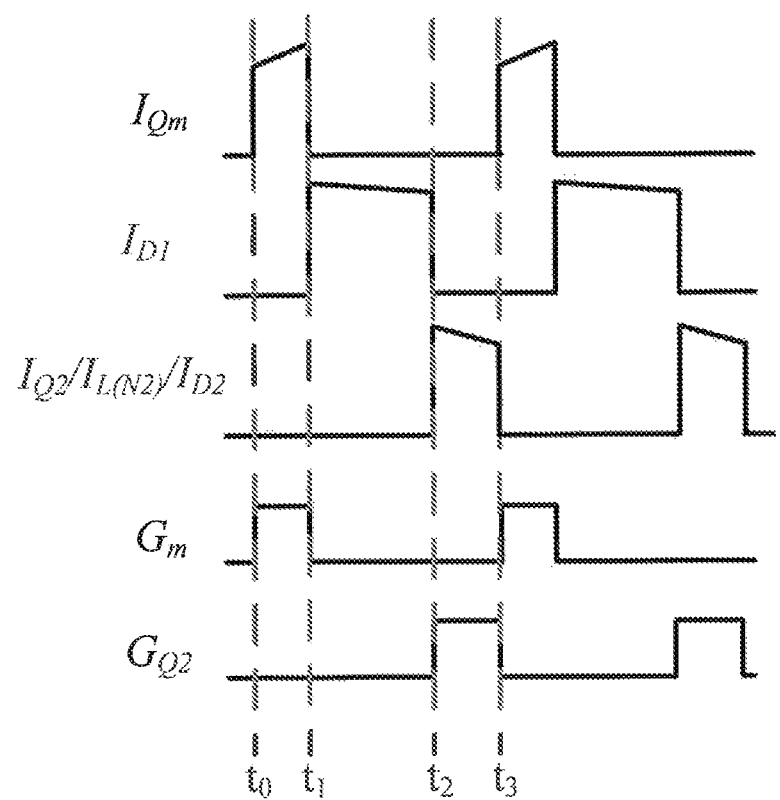
FIG. 17 shows a timing diagram for the buck-boost converter embodiment of FIG. 8 operating at CCM and GQ2 under leading edge modulation.
Figure 18:
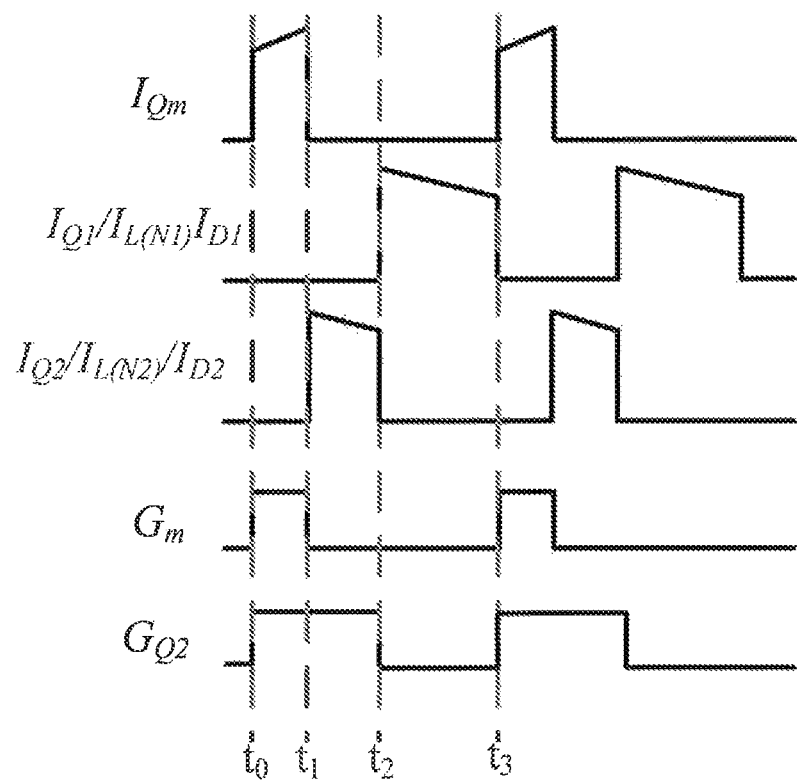
FIG. 18 shows a timing diagram for the buck-boost converter embodiment of FIG. 8 operating at CCM and GQ2 under trailing edge modulation.
Figure 19:
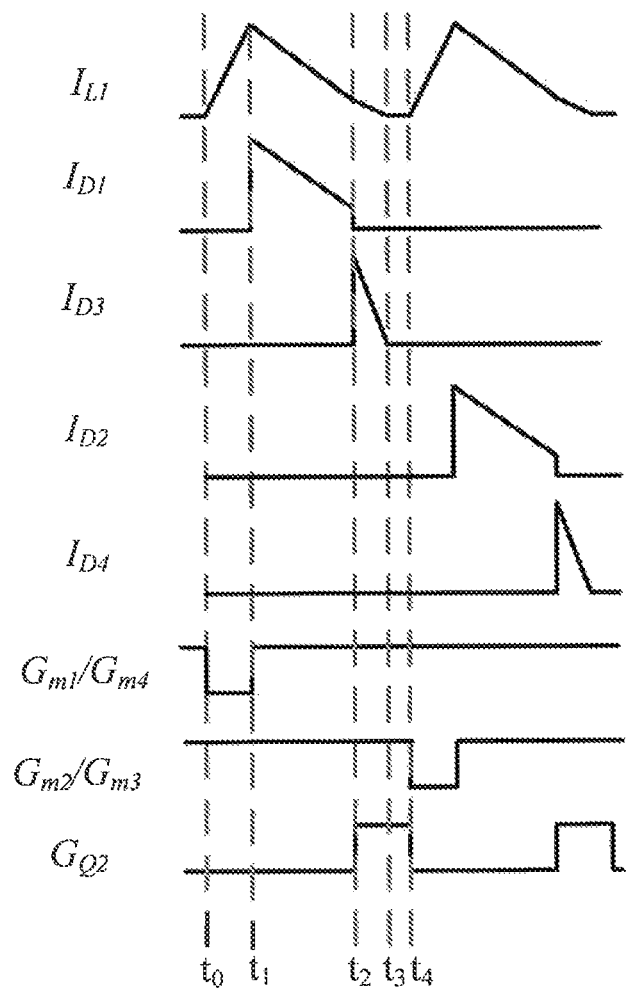
FIG. 19 shows a timing diagram for the isolated boost converter embodiment of FIG. 9 operating at DCM and GQ2 under leading edge modulation.
Figure 20:
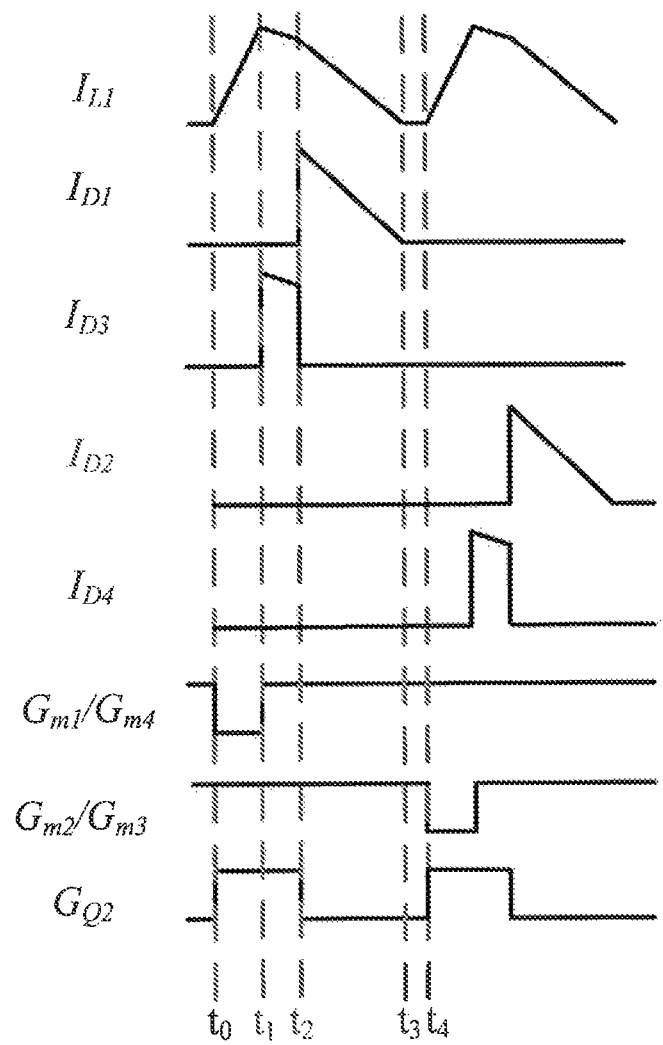
FIG. 20 shows a timing diagram for the isolated boost converter embodiment of FIG. 9 operating at DCM and GQ2 under trailing edge modulation.
Figure 21:
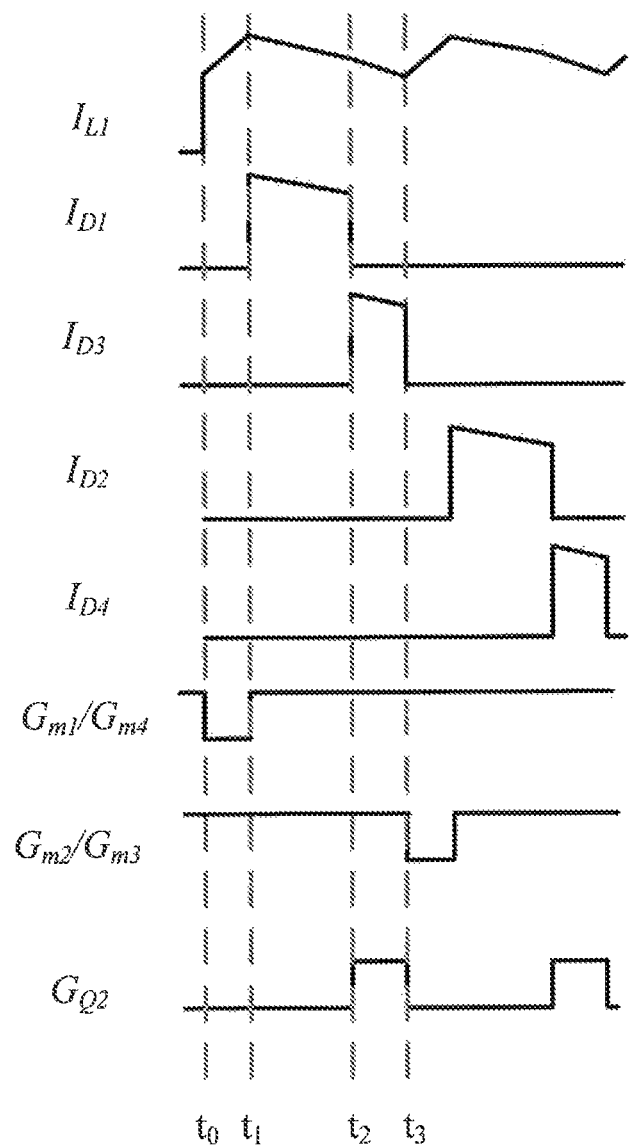
FIG. 21 shows a timing diagram for the isolated boost converter embodiment of FIG. 9 operating at CCM and GQ2 under leading edge modulation.
Figure 22:
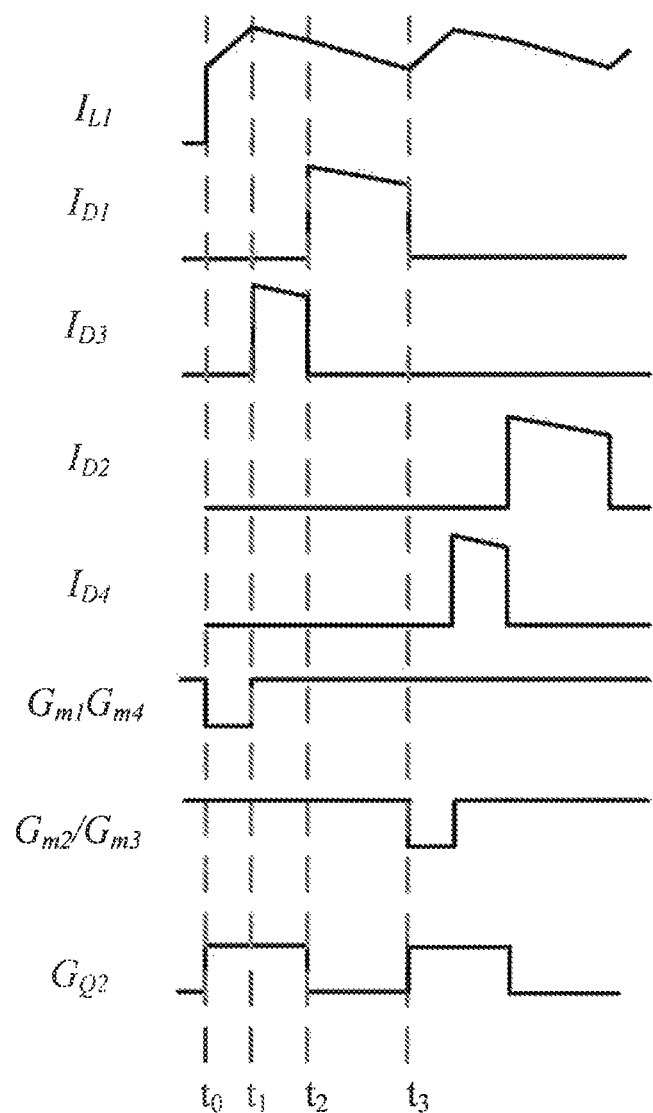
FIG. 22 shows a timing diagram for the isolated boost converter embodiment of FIG. 9 operating at CCM and GQ2 under trailing edge modulation.

Alternatively, a flyback converter embodiment may also operate under the following three conditions: (i) CCM while the gate driving signal of Q2, GQ2, is under trailing edge modulation; (ii) DCM while GQ2 is under trailing edge modulation; and (iii) CCM while GQ2 is under leading edge modulation. The waveforms of these three conditions are shown in FIGS. 12, 13, and 14, respectively.

Figure 23:
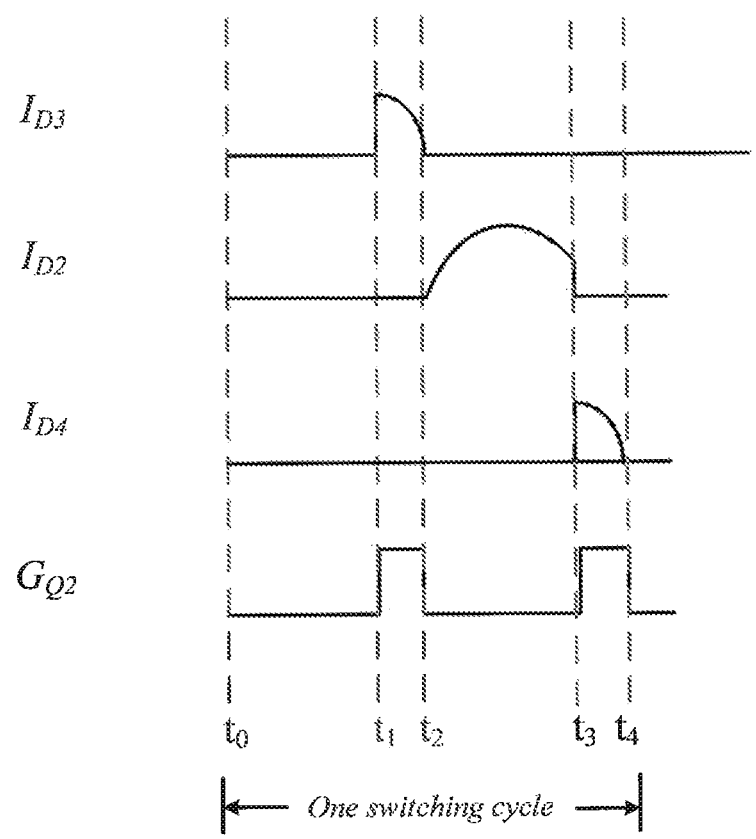
FIG. 23 shows a timing diagram for the LCLC converter embodiment of FIG. 10 operating with GQ2 under leading edge modulation.
Figure 24:
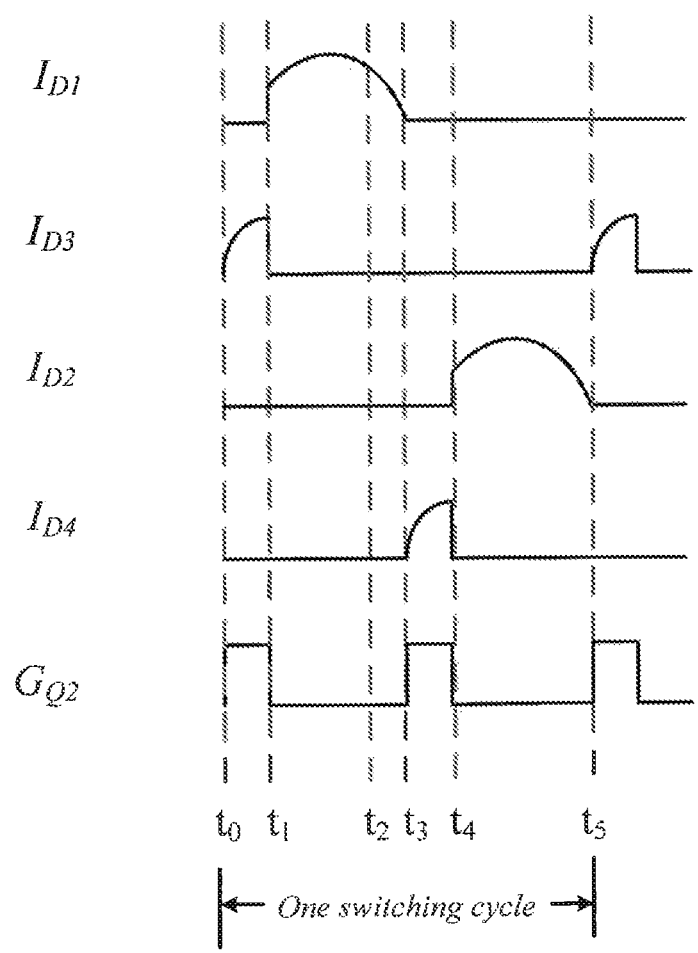
FIG. 24 shows a timing diagram for the LCLC converter embodiment of FIG. 10 operating with GQ2 under trailing edge modulation.

Similar switching operation during one switching cycle may be applied to a buck-boost topology (see, for example, FIGS. 15-18), an isolated boost topology (see, for example, FIGS. 19-22), and an LCLC topology (see, for example, FIGS. 23 and 24).

In the embodiments described, the power semiconductor switches, for example Qm and Q2, are implemented by MOSFET. However, other types of power semiconductor switches, such as BJT, IGBT, and thyristor may also be used if desirable for a particular application, The diodes, e.g., D1, D2, D3, D4, may also be implemented by MOSFET. A MOSFET can reduce voltage drop on the device so that conduction loss can be reduced.

Controller

Figure 25:
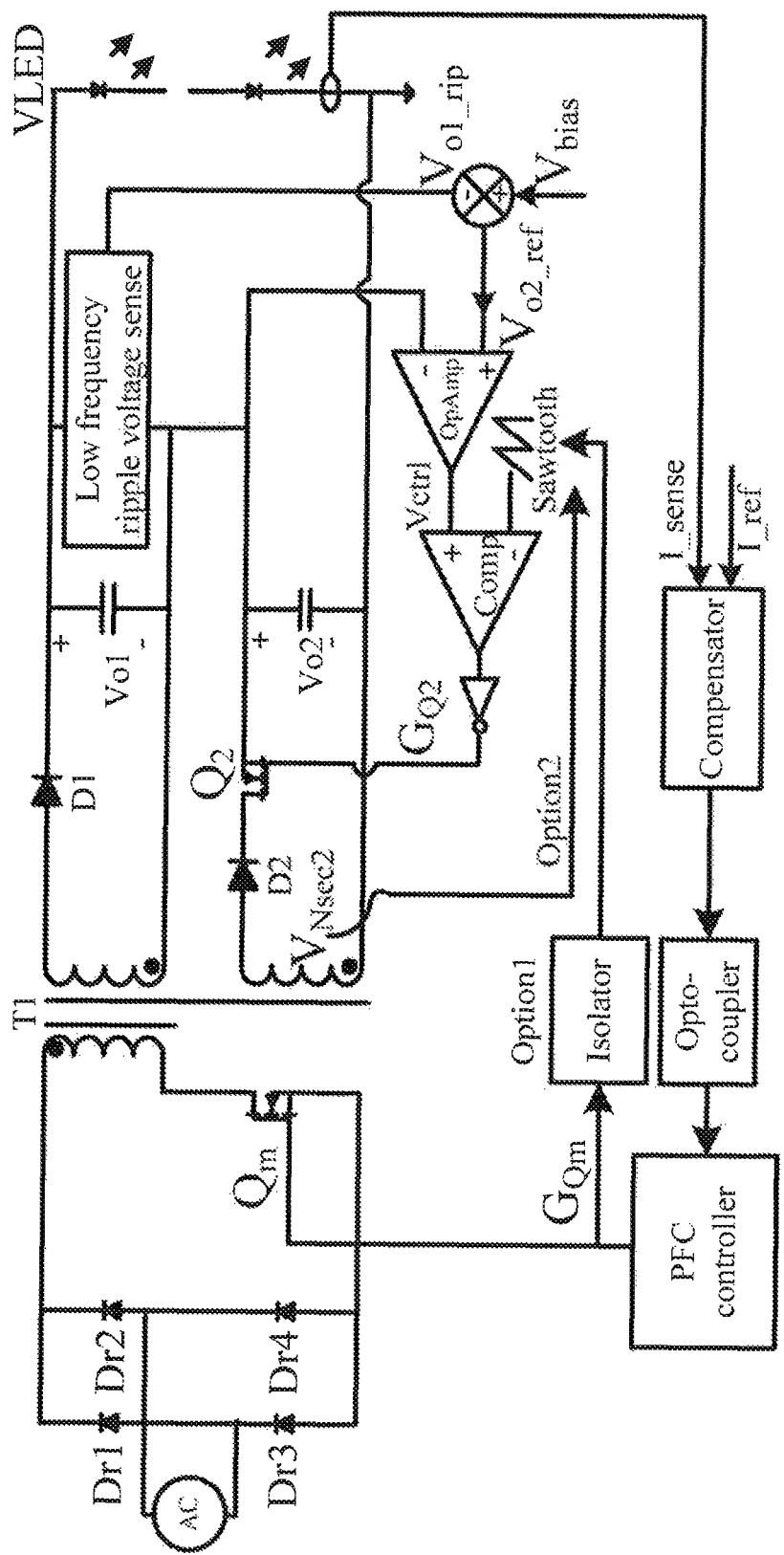
FIG. 25 is a control diagram for a flyback converter used to drive LEDs, according to an embodiment.

FIG. 25 shows an example of a controller fir a flyback converter embodiment used to drive LEDs. Strategies to achieve $V_{o2}$ regulation, LED current regulation, and high power factor are discussed below.

$V_{o2}$ Regulation

To achieve ripple cancellation, $V_{o1}$ is sensed by a low frequency ripple sensing circuit. The sensed result, $V_{o1\_rip}$, is then inverted and added with a DC bias voltage, $V_{bias}$. The combined voltage, $V_{o2\_ref}$, is used as the reference voltage for controlling $V_{o2}$.

$$V_{o2\_ref}=V_{bias}-V_{o1\_rip} \qquad (2)$$

Figure 26:
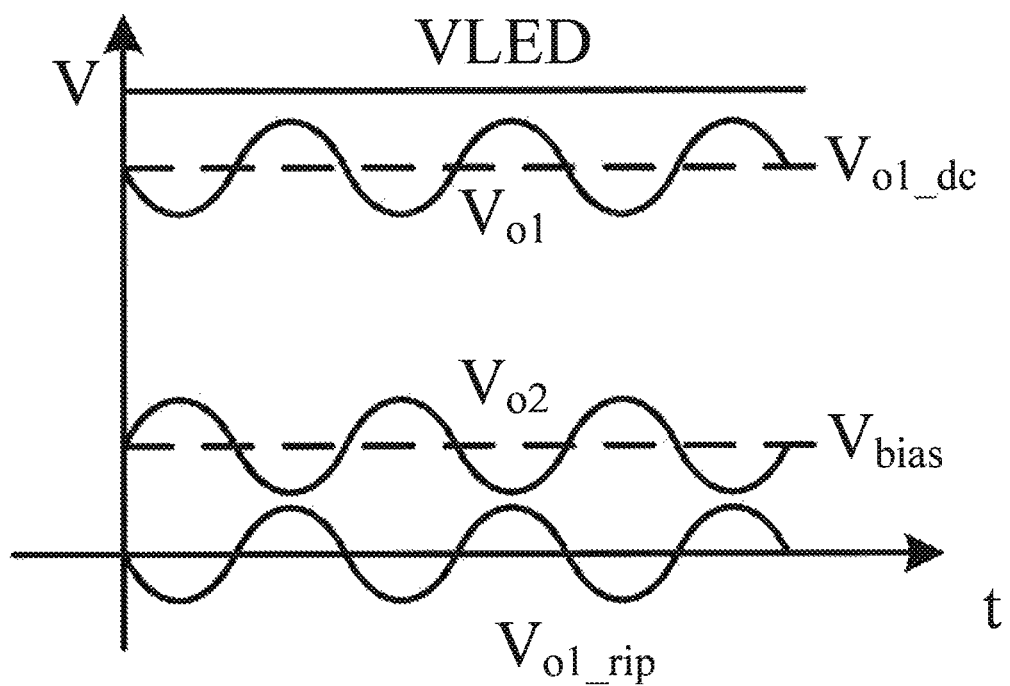
FIG. 26 shows waveforms illustrating an example of ripple cancellation.

Accordingly, the result $V_{o2\_ref}$ contains a low frequency ripple voltage opposite in phase to that of $V_{o1\_rip}$. $V_{o2\_ref}$ is used to control $V_{o2}$ through a feedback loop so that $V_{o2}$ also contains an opposite ripple voltage to $V_{o1\_rip}$. The waveforms of $V_{o1}$, $V_{o1\_dc}$, $V_{ol\_rip}$, $V_{o2}$, and $V_{bias}$ are illustrated in FIG. 26. The LED voltage, which is the sum of $V_{o1}$ and $V_{o2}$, is a DC voltage and is described below:

$$V_{LED}=V_{o1}+V_{o2}=(V_{o1\_dc}+V_{o1\_rip})+(V_{bias}-V_{o1\_rip})=V_{o1\_dc}+V_{bias} \qquad (3)$$

Operation of the $V_{o2}$ feedback loop is described as follows. $V_{o2}$ is sent to the inverting input of an operational amplifier (opamp) while $V_{o2\_ref}$ is sent to the non-inverting input of the opamp. The output of the opamp is $V_{ctrl}$ and is sent to the non-inverting input of a comparator, Comp. A saw tooth signal is sent to the inverting input of the comparator. The output of the comparator is inverted, producing the gate driving signal $G_{Q2}$ for MOSFET Q2. With a negative feedback loop, $V_{ctrl}$ automatically settles to a level that produces a correct duty cycle in each switching period for $G_{Q2}$.

The timing of the saw tooth waveform at the secondary side should be linked with the timing of the primary side gate driving so that the switching action of Qm and Q2 are synchronized. There are two options for this linking. Option 1 is to use a digital isolator to link the two signals. In Option 2, the voltage on transformer winding Nsec2 is used to link the primary side gate driving signal and the saw tooth waveform. When the state of Qm changes from on to off, the voltage on secondary winding Nsec2 also changes. The change of winding voltage is used as a timing signal to produce the saw tooth waveform. Option 2 is preferred in most cases as it does not require an isolator.

LED Current Regulation

The operation of LED current regulation is described with reference to FIG. 25. The regulation of LED current is achieved by an outer current feedback loop. The outer current feedback loop includes a compensation circuit (compensator) at the secondary side, an opto-coupler, and a PRC controller at the primary side. The compensator may be designed based on a TL431 compensator (ON Semiconductor, Phoenix, Ariz.) or a general purpose operational amplifier. The LED current is sensed and the sent to compensator. The current reference is also sent to compensator to regulate LED current by the feedback loop. The feedback signal at the secondary side travels to the primary side through the opto-coupler. The primary side feedback signal changes the duty cycle of MOSFET $Q_m$, which further changes $V_{o1}$. $V_{o1}$ settles to a value where the sum of $V_{o1}$ and $V_{o2}$, $V_{LED}$, produces a LED current that substantially equals the reference current.

Figure 27:
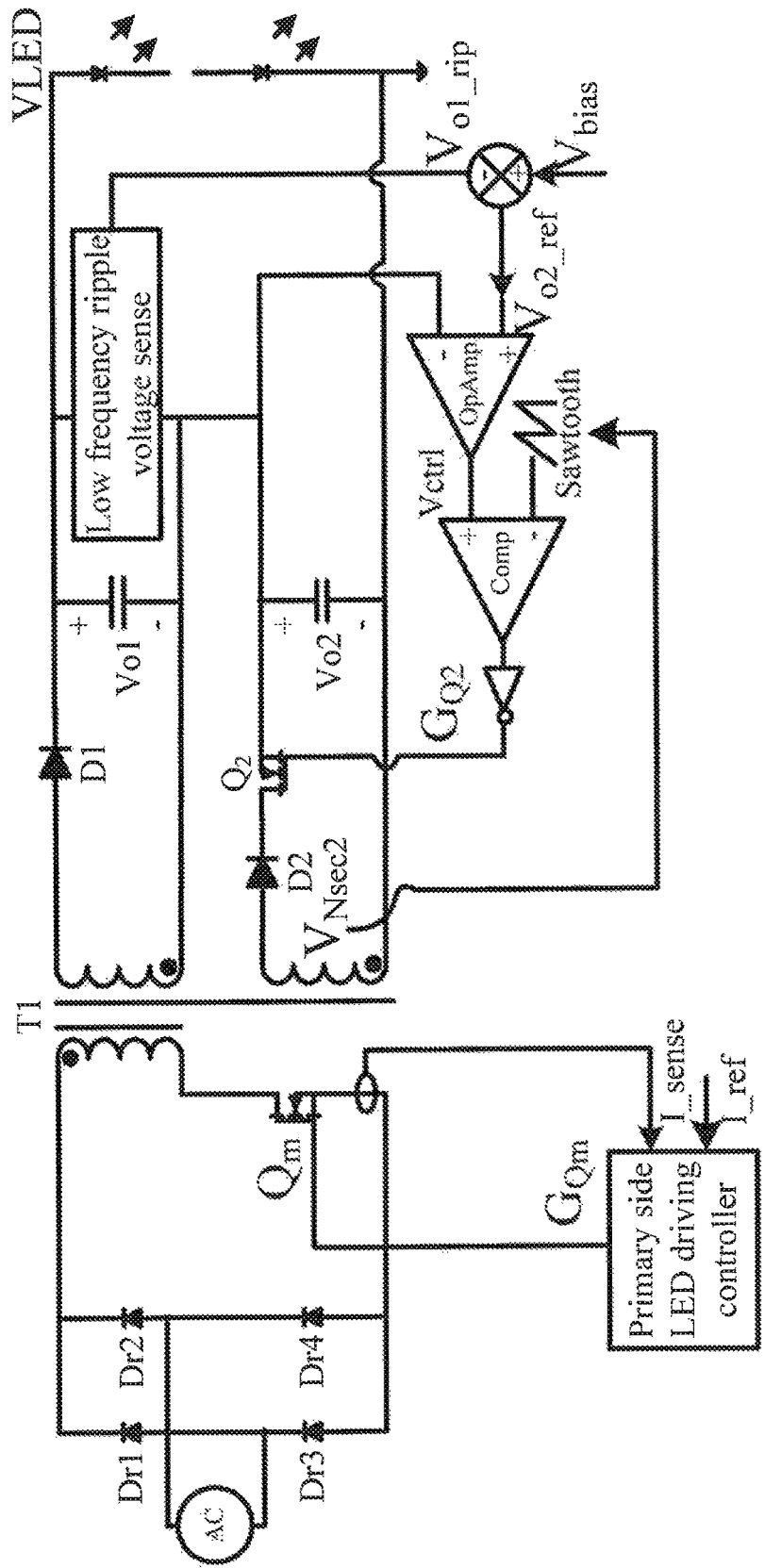
FIG. 27 is a control diagram for a flyback converter with a primary side LED current sensing scheme.
Figure 28:
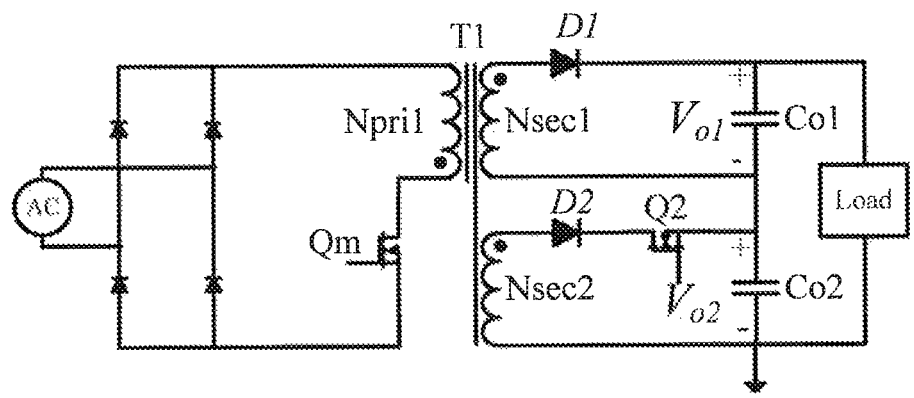
FIG. 28 shows a strategy for primary side LED current sensing with a flyback converter, according to one embodiment.
Figure 28:
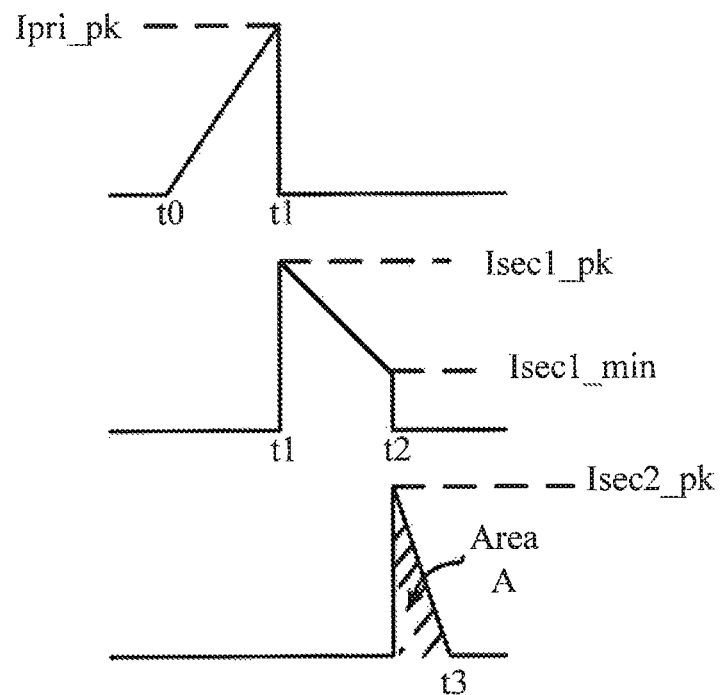
Figure 28:
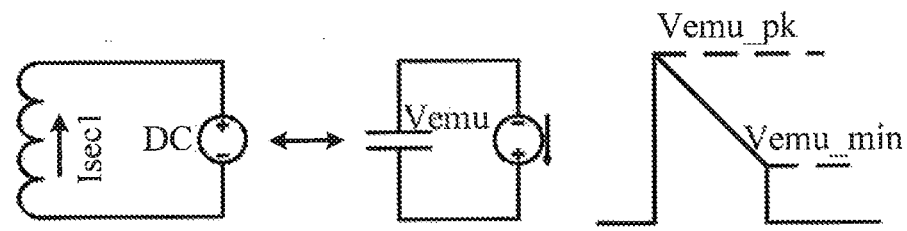

Alternatively, as shown in the embodiment of FIG. 27, the LED current may be sensed at the primary side. In this embodiment the secondary side compensation circuit and opto-coupler can be eliminated, thereby reducing component cost and design complexity. FIG. 28 shows a strategy for primary side current sensing with a flyback converter embodiment, and is described below (referring to FIG. 28, center panel):

1. Sense the peak primary side current, $I_{pri\_pk}$.
2. The peak primary side current is converted to the peak current in winding Nsec1, $I_{sec1\_pk}$.

3. Calculate the lower end current in winding Nsec1, $I_{sec1\_min}$. During time period [t1-t2], the flyback transformer is discharged via winding Nsec1. This may be emulated as a capacitor being discharged by a current source (see bottom panel of FIG. 28). For example, the peak capacitor voltage of $V_{emu}$, $V_{emu\_pk}$ may be set to represent $I_{sec1\_pk}$. The current source may be scaled such that the voltage change ($V_{emu\_pk}-V_{emu\_min}$) represents the current change ($I_{sec1\_pk}-I_{sec1\_min}$). Therefore, $V_{emu\_min}$ represents $I_{sec1\_min}$. The circuit wherein a capacitor is discharged by a current source may be implemented at the primary side. Therefore, $I_{sec1\_min}$ may be replicated at the primary side.
4. $I_{sec1\_min}$ may be further converted to $I_{sec2\_pk}$, so that $I_{sec\_pk}$ is known at the primary side.
5. The timing of $t_2$ and $t_3$ may be be detected. When Q2 is turned on at $t_2$, the voltage on the primary side winding changes. Likewise, when $I_{sec2}$ becomes zero at $t_3$, the voltage on primary side winding also changes. Therefore, the time period ($t_3-t_2$) may be calculated at the primary side.
6. The Area A represents the current flowing to $V_{o2}$ in every switching cycle, Since $I_{sec2\_pk}$ is known and ($t_3-t_2$) may be sensed, Area A represents the total current flowing to Vo1, which may be calculated.
7. In a half line cycle, the total current flowing to $V_{o2}$ equals the LED current. This way, the average LED current may be calculated at the primary side.

After sensing the LED current at the primary side, the sensed result is compared with the current reference to achieve LED current regulation.

High Power Factor

Figure 29:
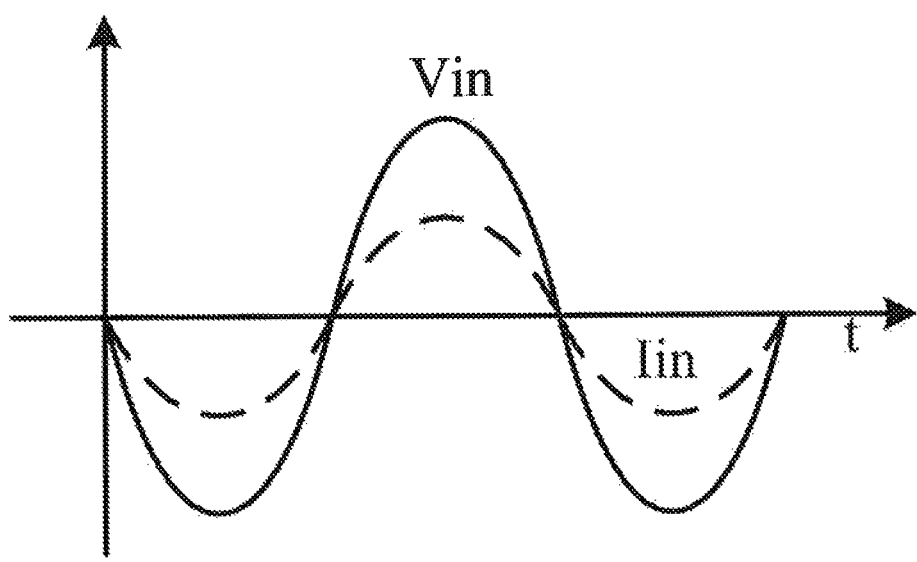
FIG. 29 shows AC input voltage and input current waveforms illustrating high power factor.

The PFC controller at the primary side forces the input current to follow the input voltage waveform. Therefore, high power factor is naturally achieved in the converter embodiments. The waveforms of AC input voltage and. AC input current are illustrated in FIG. 29.

Figure 30:
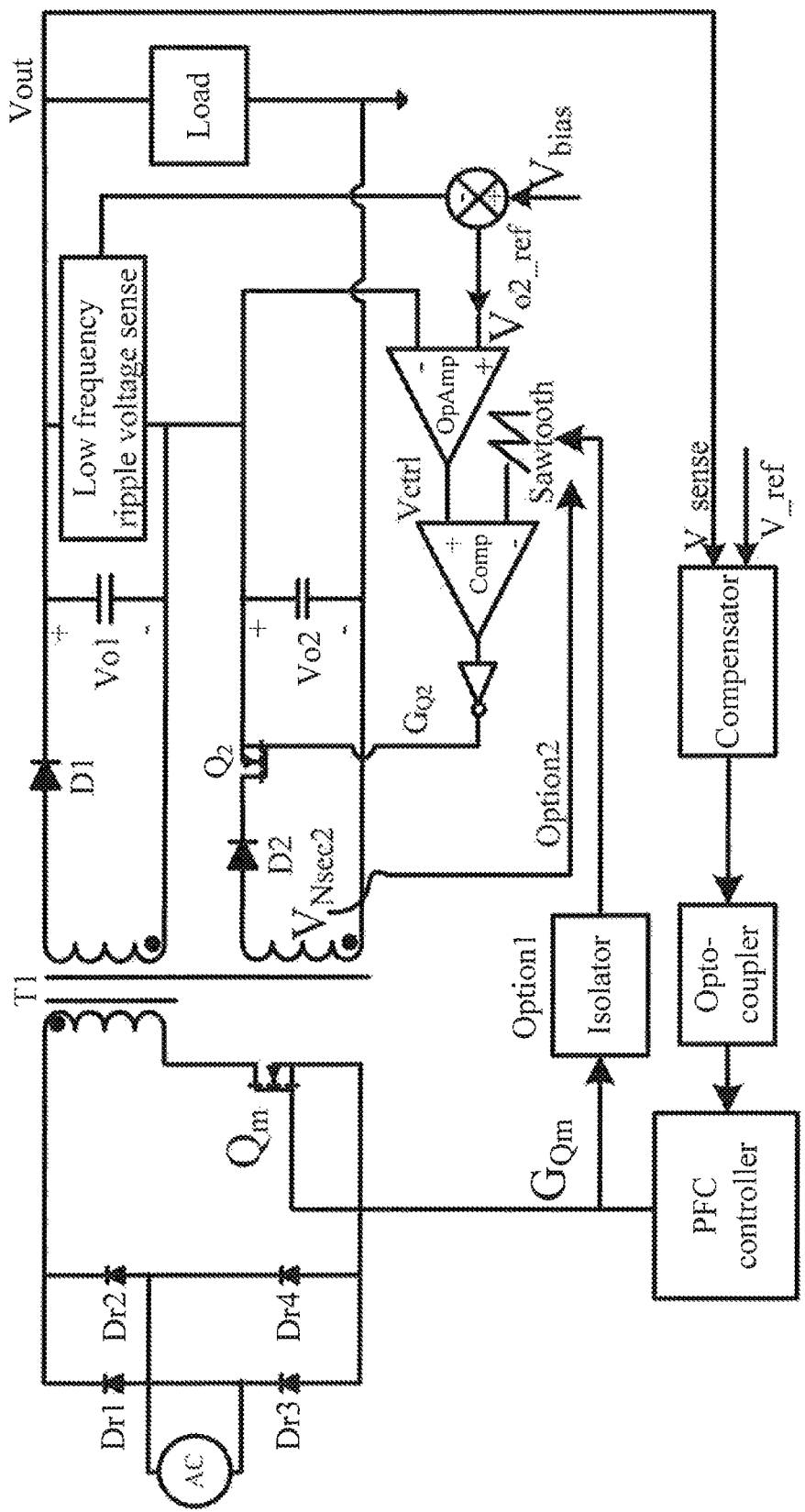
FIG. 30 shows a control diagram of a flyback converter used o drive a resistive load, according to an embodiment.

The converter embodiments may also be used to drive resistive loads. The objective then becomes regulating the output voltage instead of the output current. FIG. 30 shows an embodiment of a control diagram for such an application. The output voltage $V_{out}$ is sensed and compared with a reference voltage to achieve regulation.

Figure 31:
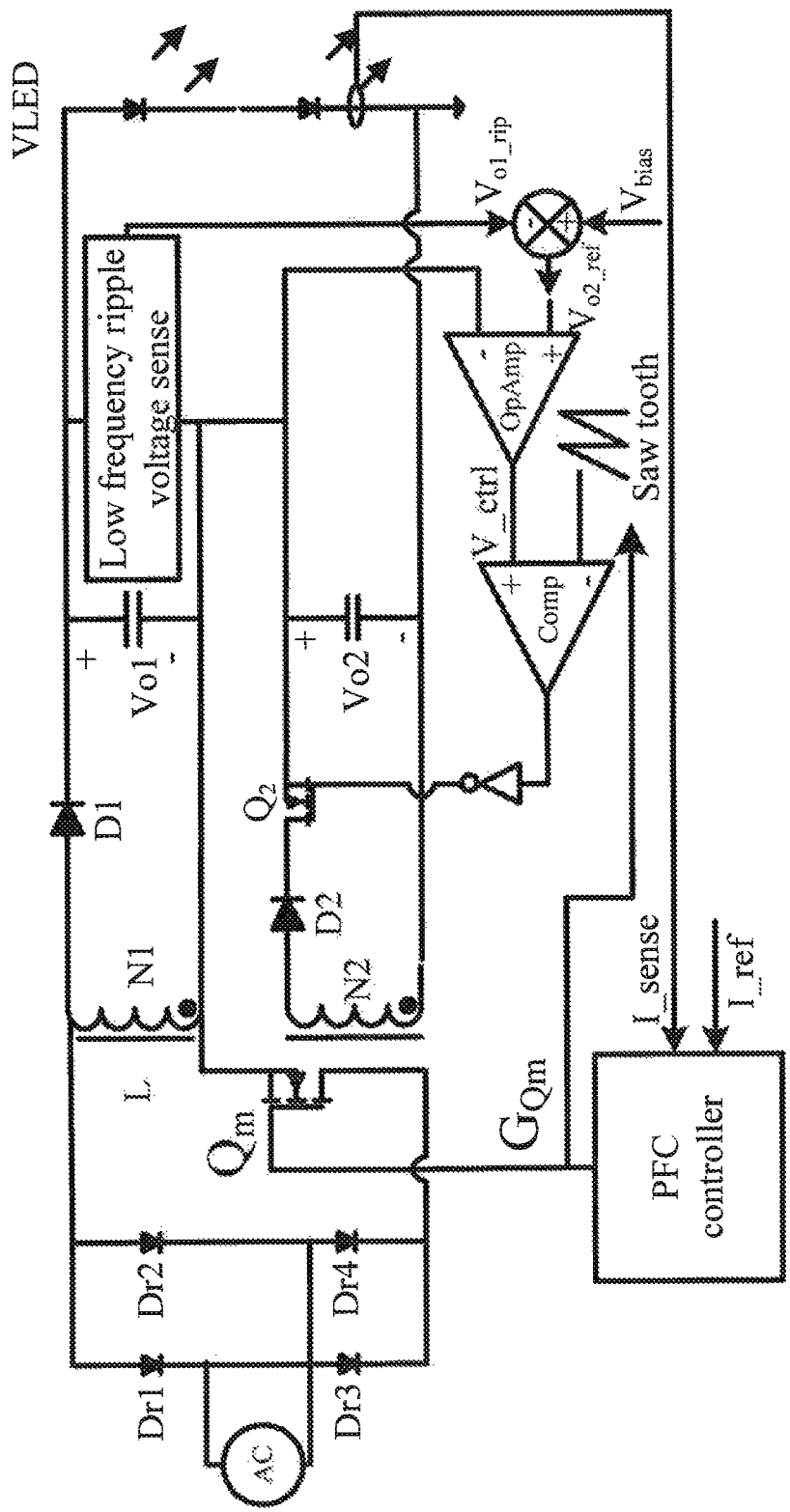
FIG. 31 shows a control diagram of a buck-boost converter used to drive an LED load, according to an embodiment.
Figure 32:
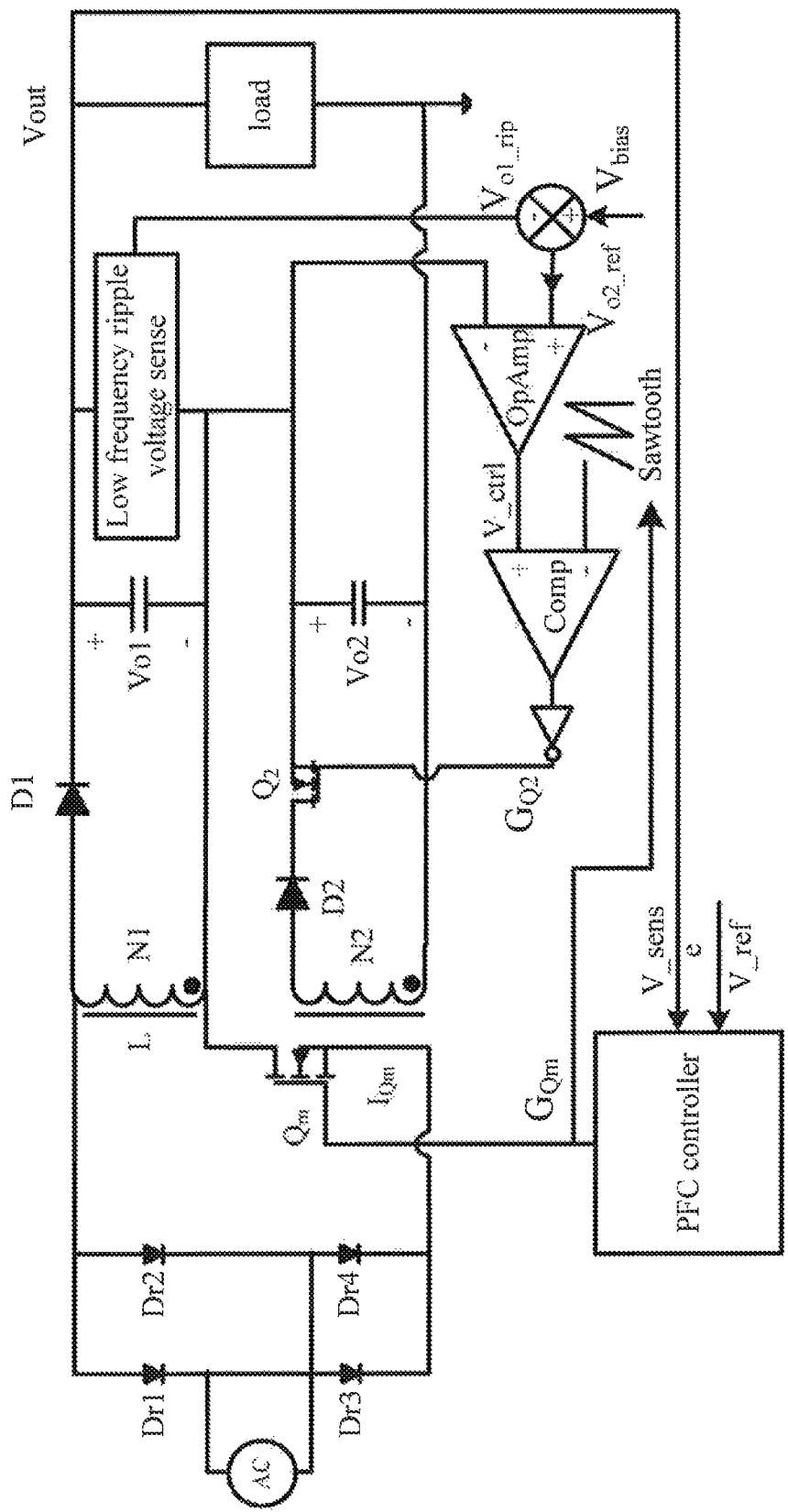
FIG. 32 is a control diagram of a buck-boost converter used to drive a resistive load, according to an embodiment.
Figure 33:
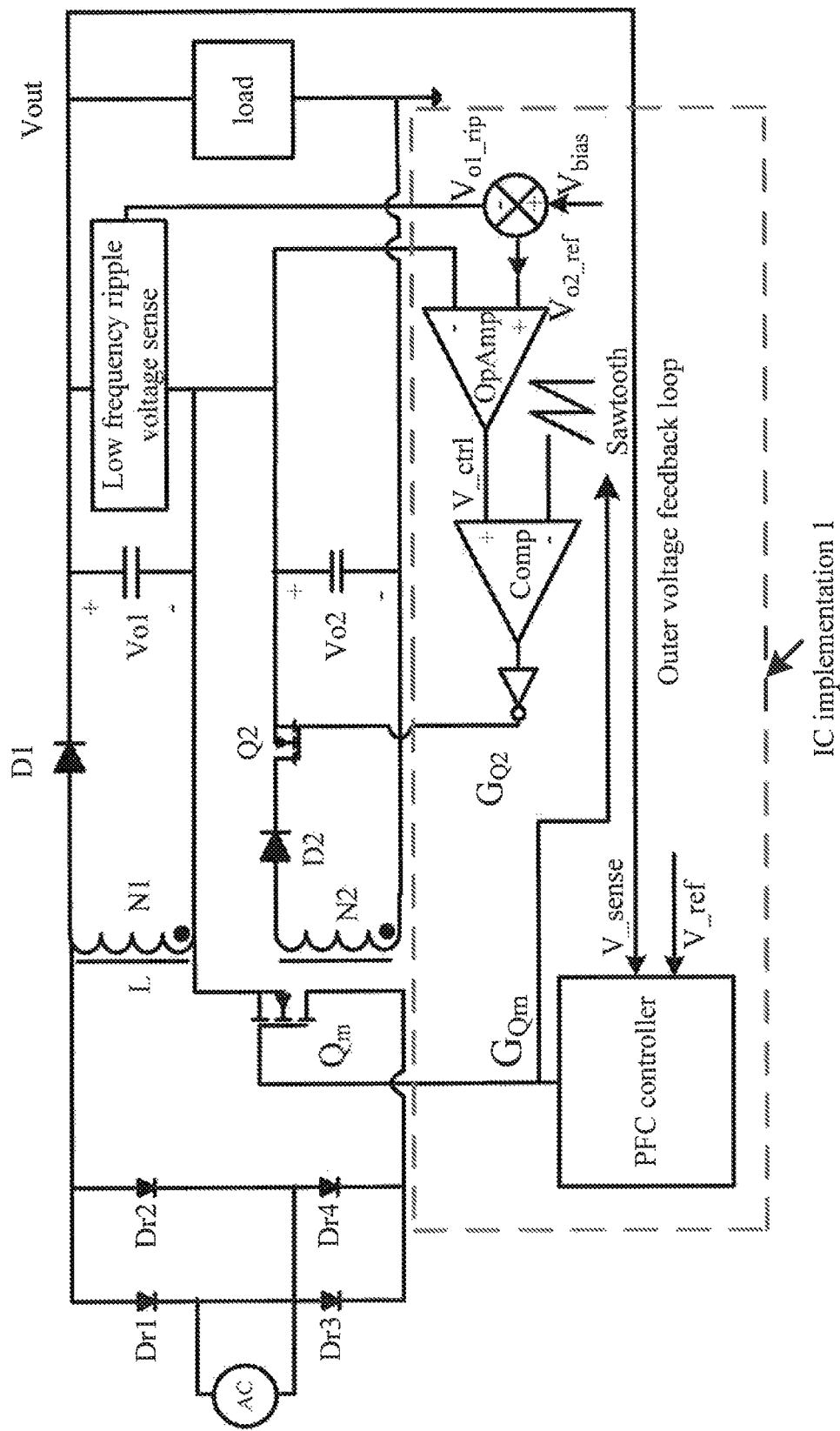
FIG. 33 shows an integrated controller for a buck-boost converter implementation.

FIGS. 31 and 32 show control diagrams for buck-boost circuits for driving LEDs and resistive loads, respectively. Since there is no isolation between the AC input side and the DC output side, the control circuit can share a common ground. Therefore, the control circuit may be integrated, FIG. 33 shows an embodiment of an integrated controller circuit.

Figure 34:
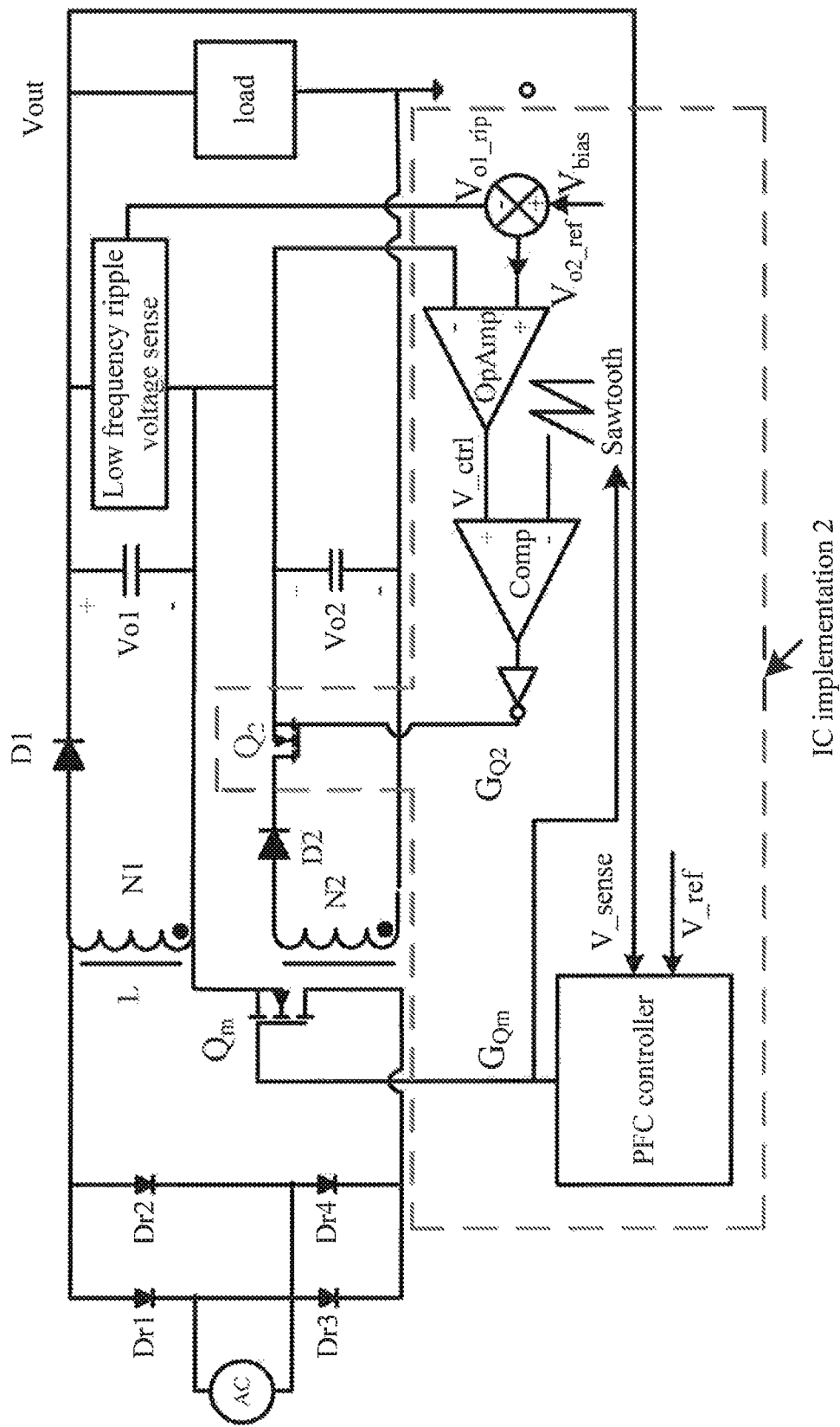
FIG. 34 shows an integrated controller with integrated Q2 for a buck-boost implementation.

In low power applications, the voltage and current stress of MOSFET Q2 may be very low, and therefore Q2 may be integrated together with the control circuit. FIG. 34 illustrates such an embodiment.

Bi-Polar Output $V_{o2}$

Figure 35:
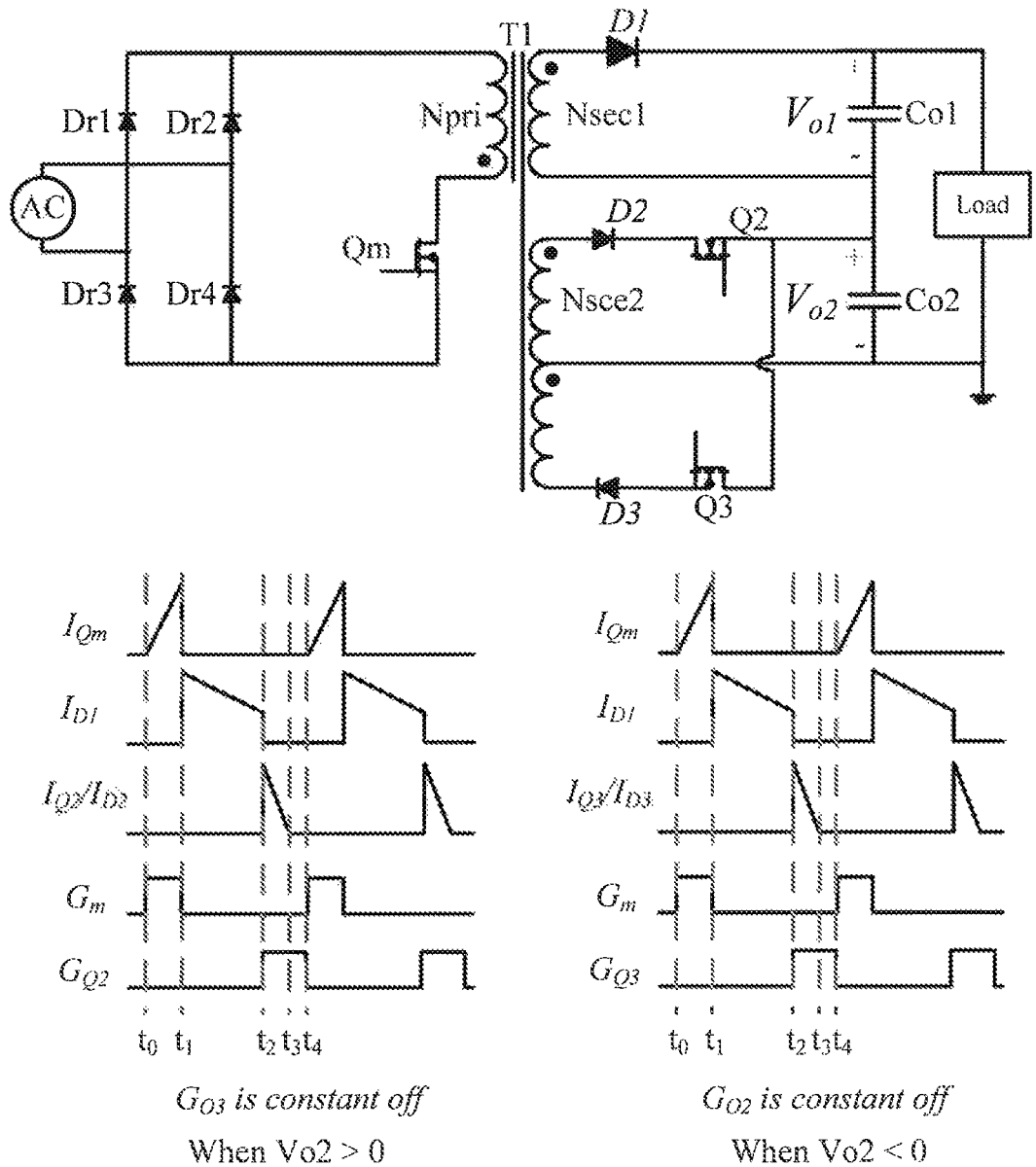
FIG. 35 shows a flyback implementation used to produce bi-polar Vo2 under DCM operation, and key waveforms.
Figure 36:
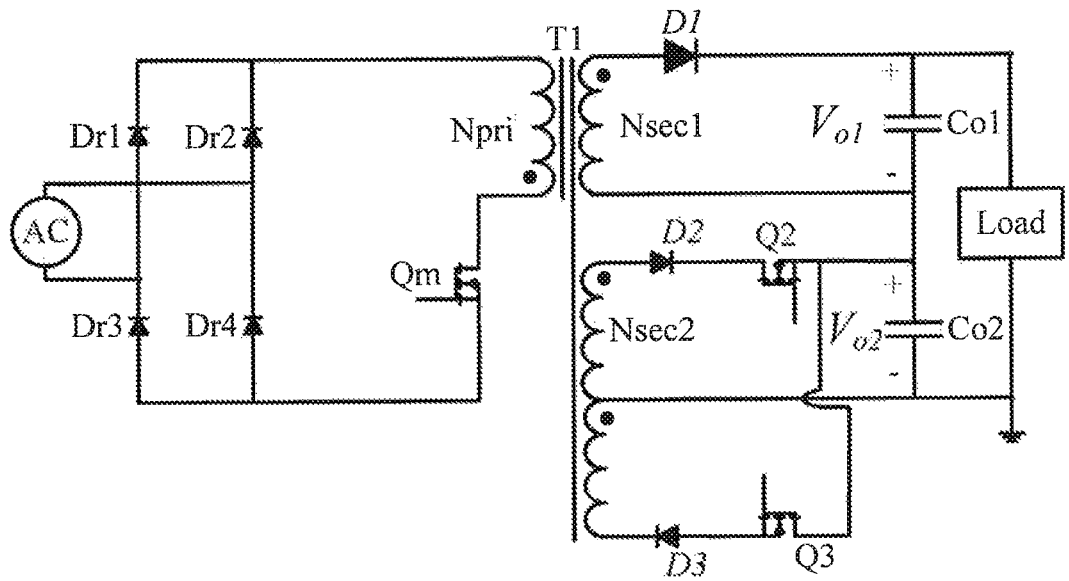
FIG. 36 shows a flyback implementation used to produce bi-polar Vo2 under CCM operation, and key waveforms.
Figure 36:
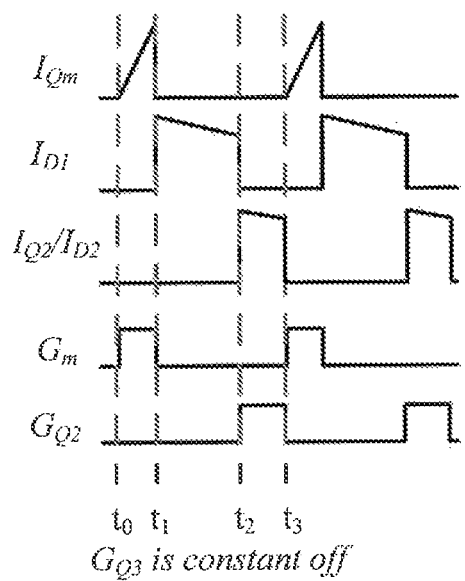
Figure 36:
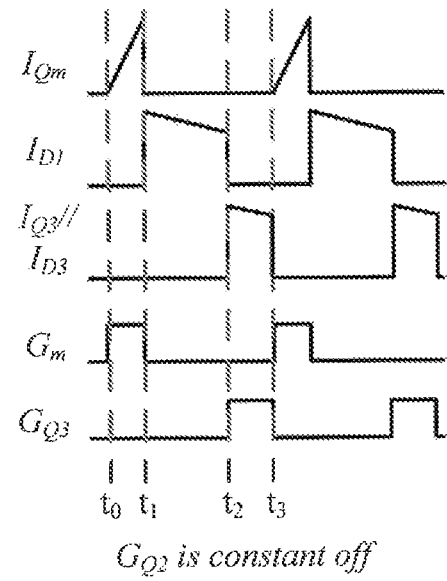
Figure 37:
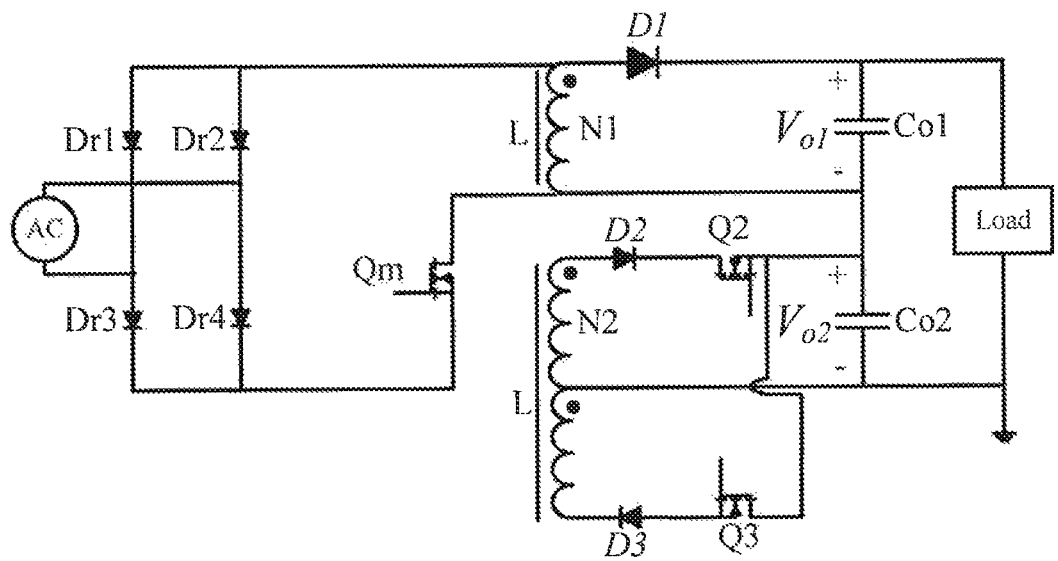
FIG. 37 shows a buck-boost implementation used to produce bi-polar Vo2 under DCM operation, and key waveforms.
Figure 37:
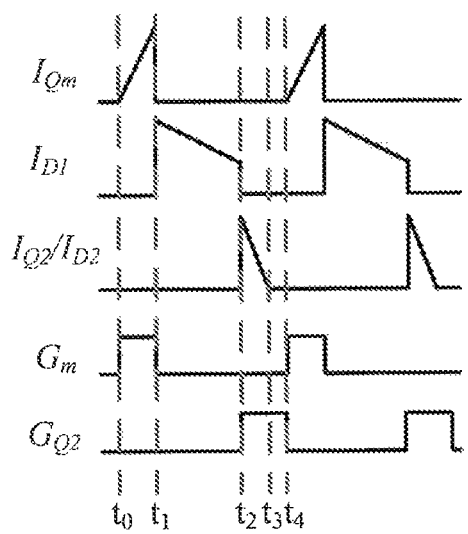
Figure 37:
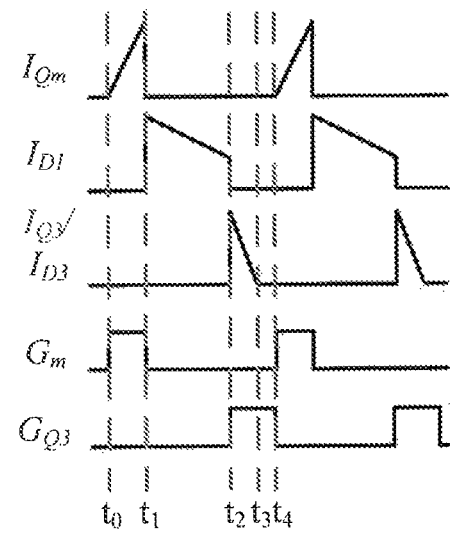
Figure 38:
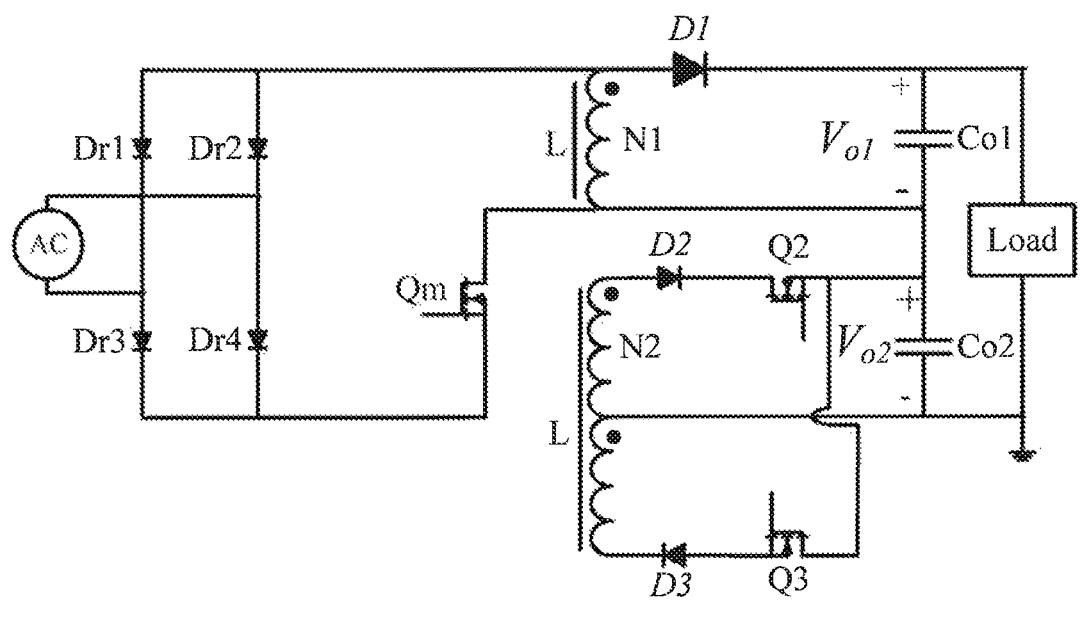
FIG. 38 shows a buck-boost implementation used to produce bi-polar Vo2 under CCM operation, and key waveforms.
Figure 38:
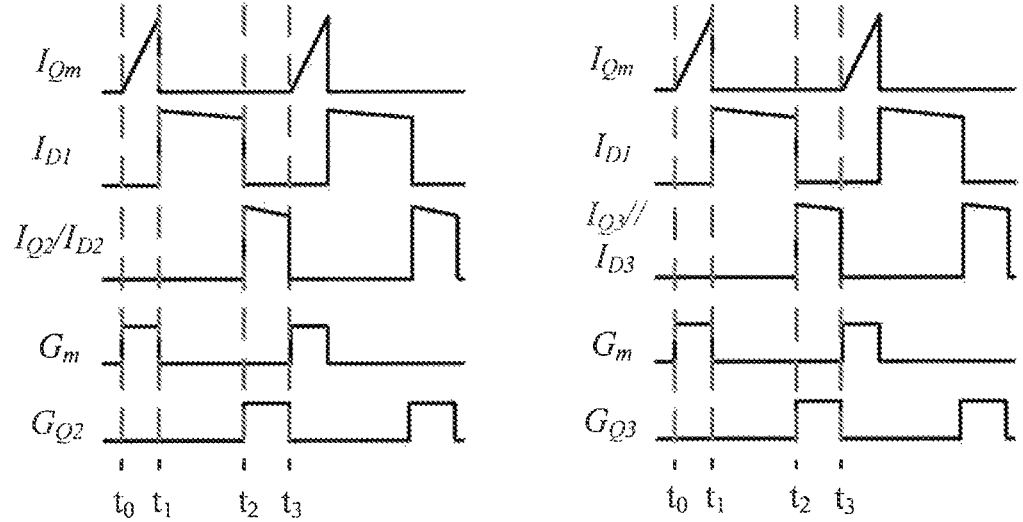
Figure 39:
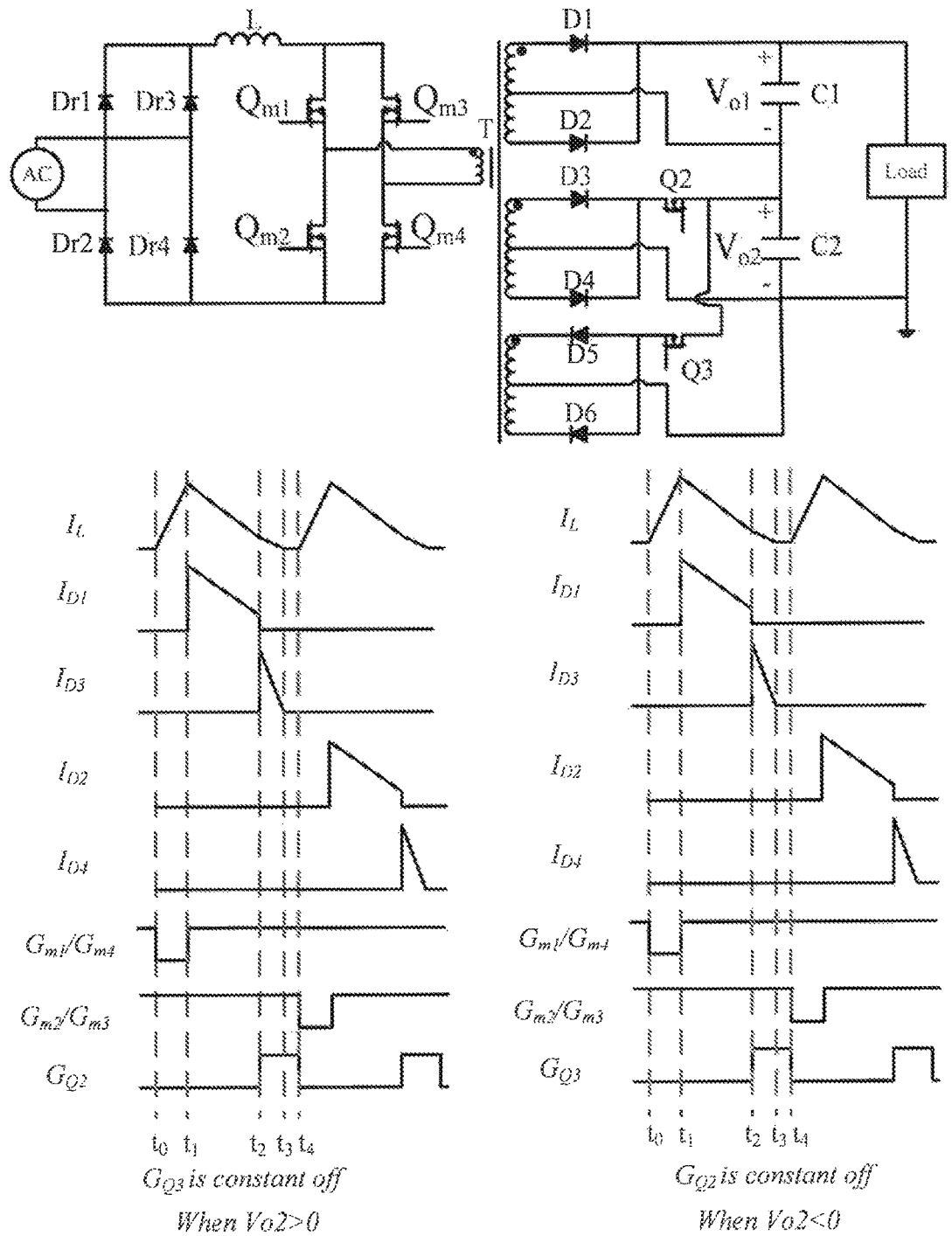
FIG. 39 shows an isolated boost implementation used to produce bi-polar Vo2 under DCM operation, and key waveforms.
Figure 40:
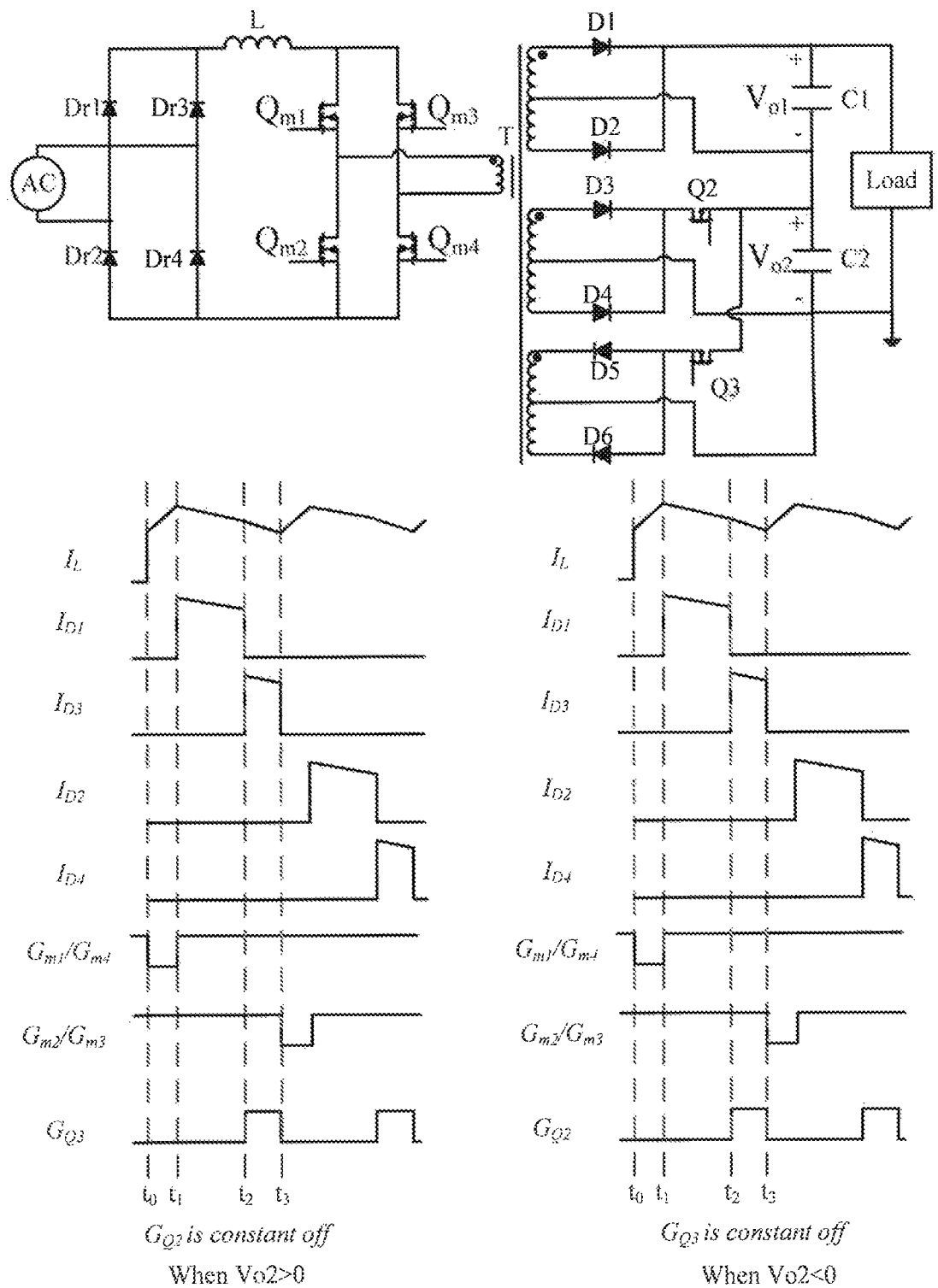
FIG. 40 shows an isolated boost implementation used to produce bi-polar Vo2 under CCM operation, and key waveforms.
Figure 41:
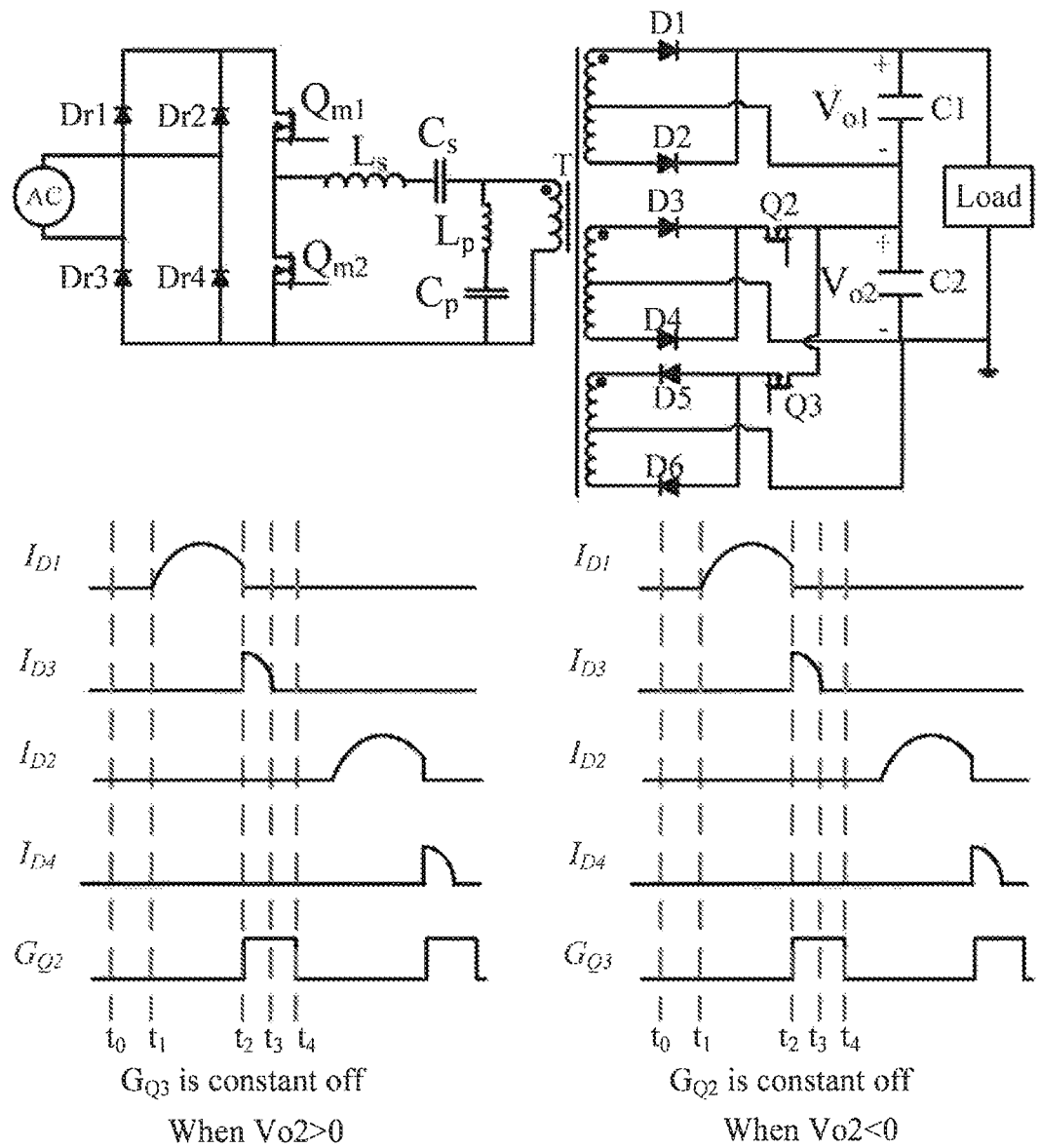
FIG. 41 shows an LCLC implementation used to produce bi-polar Vo2, and key waveforms.

When $V_{o2}$ is centered at zero voltage (bi-polar $V_{o2}$), the average and peak power delivered by $V_{o2}$ is reduced compared to the case when $V_{o2}$ is biased to above zero. Therefore, the current stress for added components will be reduced. FIGS. 35 and 36 show circuit implementations suitable for producing a hi-polar output $V_{o2}$ based on a flyback topology, and corresponding waveforms under DCM and CCM operation. When $V_{o2}$ is positive, Q2 is active in every switching cycle and is used to achieve energy channelling while Q3 is constantly off. When $V_{o2}$ is negative, Q3 is active in every switching cycle and is used to achieve energy channelling while Q2 is constantly off.

Similar circuit implementations may be made using buck-boost converter, isolated boost converter, and LCLC converter topologies, etc., as shown in FIGS. 37-41.

Pulse Width Modulation

Figure 42:
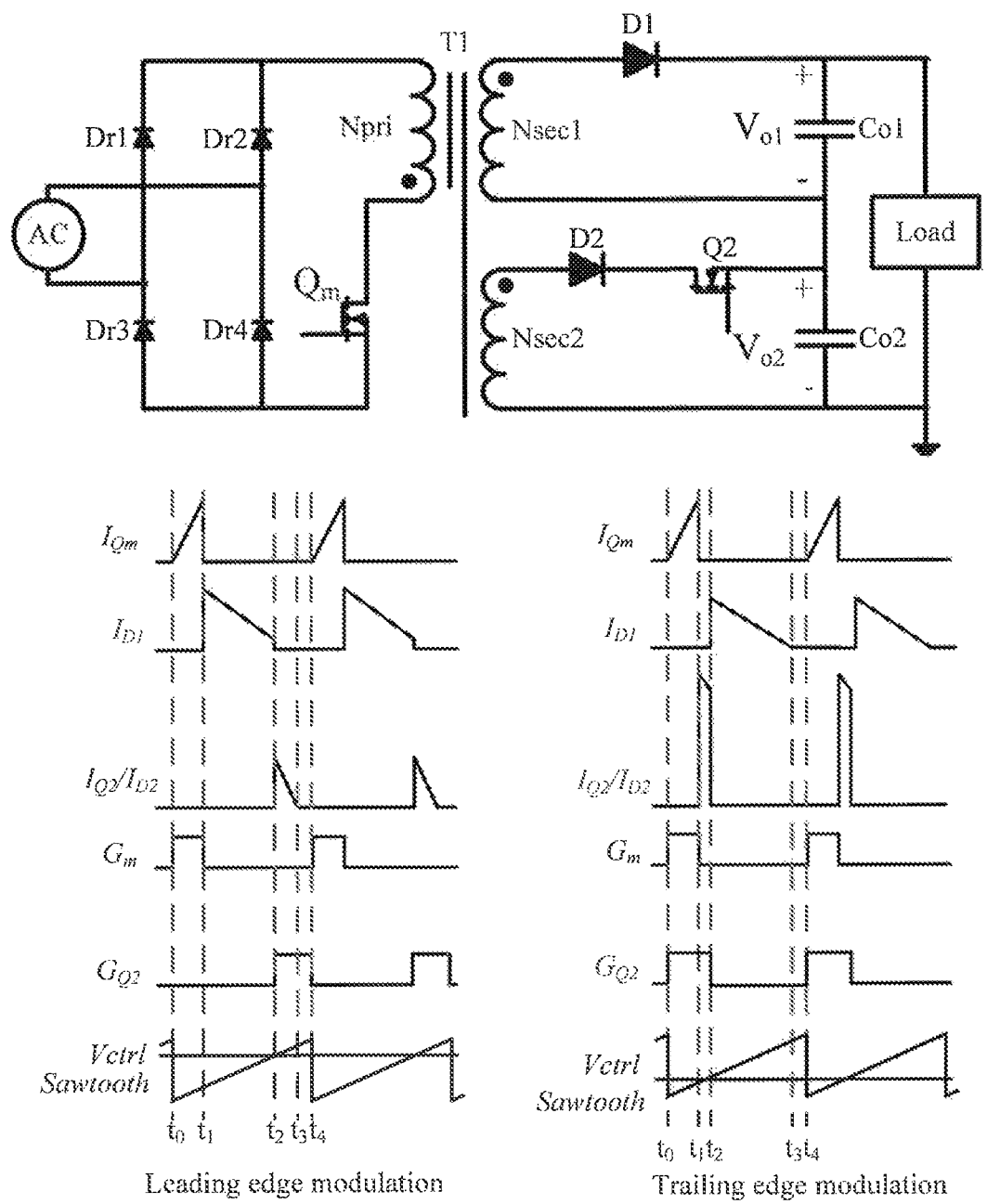
FIG. 42 shows trailing edge modulation and leading edge modulation for Q2 of a flyback implementation.

There are two ways to modulate the gate driving signal for Q2: leading edge modulation and trailing edge modulation. FIG. 42 shows the switching waveforms of a flyback converter embodiment when GQ2 is under two different modulation methods. The waveforms shown on the left are for GQ2 under leading edge modulation, and the waveforms shown on the right are for GQ2 under trailing edge modulation.

Under trailing edge modulation, Q2 is turned on fixed at the beginning of a switching cycle and Q2 is turned off when the control signal Vctrl and the saw tooth sianal cross. Just before Qm is turned off, the inductive current in the primary side winding Npri reaches peak value. When Qm is turned off, the inductive current commutes from the primary side winding Npri to the secondary side winding Nsec2. Thus, the peak inductive current in winding Nsec2 flows in Q2.

Under leading edge modulation, Q2 is turned on when the control signal Vctr1 and the saw tooth signal cross and Q2 is turned off fixed at the end of the switching cycle. Before Q2 is turned on, the inductive current flows in winding Nsec1 and transfers energy to $V_{o1}$. When Q2 is turned on, the inductive current has already decreased from its peak value. In general, applying leading edge modulation for GQ2 may reduce the current stress of Q2, and may be significantly beneficial when the flyback converter works under DCM condition.

Special Operating Condition

Figure 43:
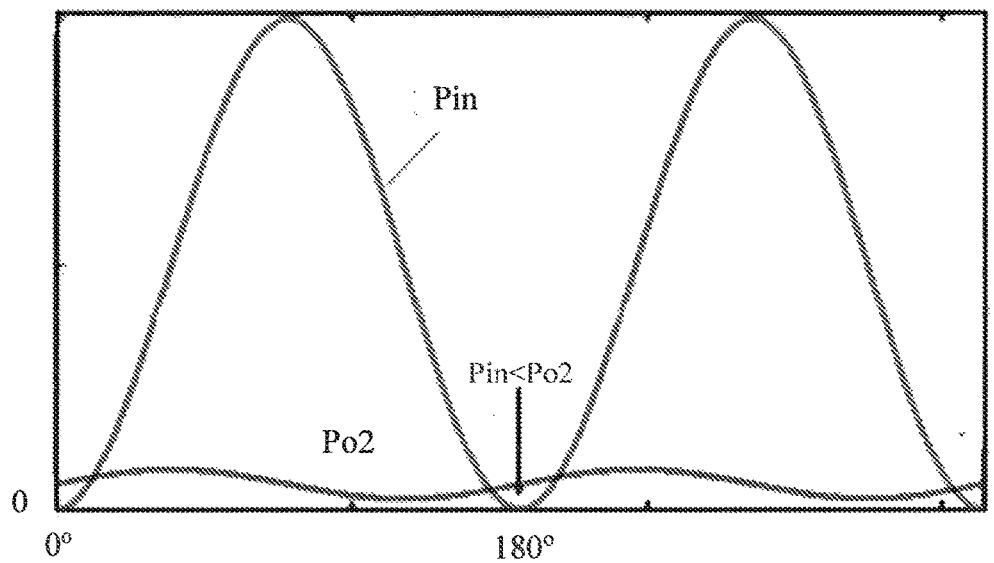
FIG. 43 is a plot of input power and required power to sustain Vo2 (for parameters Vo1=45 VDC+/−3 Vrip, Vo2=5 VDC+/−3 Vrip, Vout=Vo1+Vo2=50 V, Iload=0.2 A).

For an energy channelling converter as described herein, the average input current follows the input voltage to achieve high power factor. When the input voltage is close to zero, so is the average input current. The instantaneous input power is therefore also close to zero and will not be enough to sustain $V_{o2}$. However, even when Q2 is fully on so that the energy drawn from the AC input is fully transferred to $V_{o2}$ in a switching cycle, it is still less than what is required to maintain $V_{o2}$. As a result, $V_{o2}$ regulation may be lost. FIG. 43 is a plot of the input power and the required power to sustain $V_{o2}$ under given circuit parameters ($V_{o1}$=45 VDC+/-3 $V_{rip}$, $V_{o2}$=5 VDC+/-3 $V_{rip}$, $V_{out}=V_{o1}+V_{o2}$=50 V, $I_{Load}$=0.2 A). As shown, there is a small operating range where the input power is lower than the required power to maintain $V_{o2}$.

When the AC input voltage/rectified input voltage is close to zero, $V_{o2}$ is close to its average level. During this moment, the power required to maintain $V_{o2}$ is $$P_{o2\_avg} = V_{o2\_avg} \times I_{LED} \tag{4}$$

In Equation (4), $P_{o2\_avg}$ is the required power to maintain $V_{o2}$ when $V_{o2}$ is at its average value. Since high power factor is achieved, the input current follows the input voltage and the instantaneous input power can be expressed as $$P_{in}(t) = V_{in}(t) \times I_{in}(t) = V_{in}(t) \times V_{in}(t) \times \frac{P_{out}}{(V_{in\_rms})^2} \tag{5}$$

The critical input voltage may be defined as the voltage when the instantaneous input power equals to the required power to maintain $V_{o2}$. The critical input voltage, $V_{in\_crit}$, may be expressed as $$|V_{in\_crit}| = \sqrt{\frac{P_{o2\_mid} \times (V_{in\_rms})^2}{P_{out}}} \quad (6)$$

Figure 44:
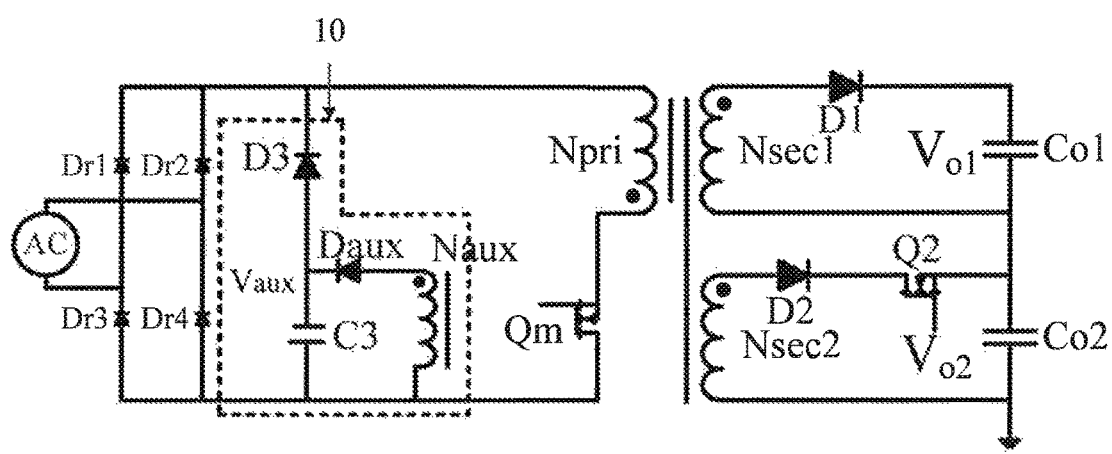
FIG. 44 shows an added circuit to boost input power for a flyback converter implementation.

When the input voltage is lower than $V_{in\_crit}$, the available input power becomes less than the required power to maintain $V_{o2}$ and this may make $V_{o2}$ uncontrollable, One way to solve this insufficient energy problem is to have another energy source provide power to maintain $V_{o2}$. For example, in FIG. 44, an added circuit 10 provides an auxiliary voltage $V_{aux}$, produced from an auxiliary winding $N_{aux}$ of the power transformer. D3 is used to separate $V_{aux}$ from rectified AC input voltage. $V_{aux}$ is designed to be no less than $|V_{in\_crit}|$. Therefore, when the AC input voltage is lower than $V_{in\_crit}$, the voltage after the rectifier is maintained at $|V_{in\_crit}|$ and enough energy can be provided to maintain $V_{o2}$. The added circuit 10 may be applied to different topology implementations (e.g., buck-boost, isolated boost, LCLC) to serve the same purpose.

It should be noted that when is providing energy to $V_{o2}$, the input rectifier is reverse biased and the AC input current becomes zero. This measure has an influence on power factor performance. It is desired to set $V_{aux}$ to the required minimum. In this case, $V_{aux}$ should be set to be equal to $|V_{in\_crit}|$. According to Equation (6), the value of $|V_{in\_crit}|$ is a function of the input AC voltage. When the input AC voltage increases, the calculated $|V_{in\_crit}|$ also increases. In an application where the input AC voltage has wide range, the auxiliary voltage $V_{aux}$ should be designed based on the maximum input AC voltage. For example, when the input voltage changes from 90 Vrms to 135 Vrms, $V_{aux}$ should be designed based on 135 Vans input.

Another way to solve the insufficient energy problem is by control, When the input voltage is below $V_{in\_crit}$, the input current should not follow the input voltage. Instead, the input current may be controlled in a way that the instantaneous input power (input voltage times input current) is equal to $P_{o2\_avg}$, as shown in Equation (7).

$$V_{in}(t) \times I_{in}(t) = P_{o2\_avg} \quad (7)$$

Figure 45:
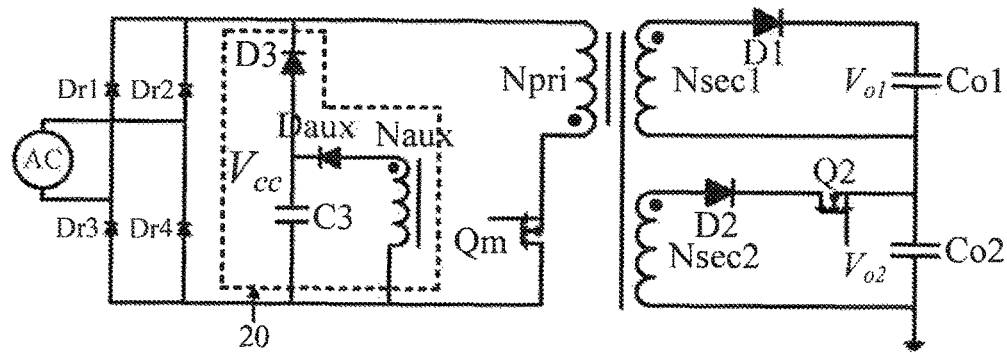
FIG. 45 shows VCC used to provide energy to Vo2 in a flyback implementation.

If the input voltage is close to zero, the input current may rise to infinity. To avoid this, the supply voltage for the controller circuit, VCC, can be shared to provide energy to $V_{o2}$ when the input voltage is lower than VCC. FIG. 45 shows an example of such a circuit 20. Diode D3 is used to separate VCC from the rectified input voltage. By changing the way of controlling input current when input voltage is lower than $V_{in\_crit}$, the circuitry that produces $V_{aux}$ may be eliminated, which reduces cost.

All cited publications are incorporated herein by reference.

Embodiments will be further described by way of the following non-limiting Examples.

For the sake of brevity, certain practical design considerations, such as power loss and parasitic elements, are ignored in the following examples.

EXAMPLE 1

This example describes a design procedure for a buck-boost AC-DC converter (refer to the circuit of FIG. 8) having a 90 Vrms to 135 Vrms input, and 10 W, 50 V, 0.2 A output, Step 1: Design auxiliary voltage $V_{aux}$. As previously discussed, $V_{aux}$ should be designed according to the maximum RMS input voltage. Therefore, $V_{aux}$ is designed based on 135 Vrms input. $V_{aux}$ may be calculated using Equation (8)

$$V_{aux} = V_{135\_min} = \sqrt{\frac{P_{o2\_mid} \times (V_{135\_rms})^2}{P_{out}}} = 38.2V \quad (8)$$

In the above calculation, $P_{o2\_mid}$ is 0.8 V (the average voltage of $V_{o2}$ is set to be 4 V and ILED is 0.2 A). The auxiliary voltage is calculated to be 38.2 V based on 135 Vrms input, which is enough to cover the input voltage range (90 Vrms to 135 Vrms).

Step 2: Determine the output capacitor Co1 for the main output $V_{o1}$ and Co2 for the ripple cancelation output $V_{o2}$. The voltage ripple on $V_{o1}$ may be approximately expressed as below:

$$C_{o1} = \frac{I_{LED}}{2 \times \pi \times f_{line} \times V_{o1\_rip}} \quad (9)$$

In the above equation, $I_{LED}$ is the LED current, $f_{line}$ is the AC line frequency (60 Hz for North America). $V_{o1\_rip}$ is the peak-to-peak ripple voltage of $V_{o1}$ and is set to 6 V. The output capacitor Co1 is calculated to be 89 μF. A 100 uF output capacitor may be used in practical design. The output capacitor Co2 is for filtering switching frequency ripple. A 10 uF ceramic capacitor is a suitable selection.

Step 3: Determine the operation mode. Because the power level is quite low, it is preferred to operate the buck-boost converter at DCM, constant on time condition in order to reduce switching loss and achieve high power factor.

Step 4: Define maximum duty cycle. The maximum duty cycle is defined when the RMS input voltage is lowest (90 Vrms in this case). The output can be considered as equivalent to 50 VDC to simplify calculations. In order to achieve DCM operation, the following inequality condition must be met:

$$V_{90\_peak} \times D_{on} < V_o \times (1 - D_{on}) \quad (10)$$

$V_{90\_peak}$ is the peak instantaneous input voltage when input voltage is 90 Vrms, which is 127 V. The calculation result indicates that the duty cycle should be less than 0.28 in order to achieve DCM. In this design example, the maximum duty cycle is set at 0.21 to leave a safety margin.

Step 5: As the output power is already known, the values of RIMS input current $I_{in\_rms}$ and peak input current $I_{in\_pk}$ may be calculated. The calculation is based on 90 Vrms input voltage.

$$I_{in\_rms} = \frac{P_{out}}{V_{in\_rms}} = \frac{10}{90} = 0.111A \quad (11)$$

$$I_{in\_pk} = \sqrt{2} \times I_{in\_rms} = 0.157A \quad (12)$$

Step 6: After duty cycle and peak input current are calculated, the peak switching current under 90 Vrms input may be calculated.

$$I_{sw\_pk} = \frac{2 \times I_{in\_pk}}{D} = 1.496A \quad (13)$$

Step 7: Set the switching frequency and calculate the inductance of winding N1. The switching frequency may be selected empirically or by calculation under the restraints of inductor size, current stress, etc. The switching frequency is set at 35 kHz (Ts=28.5 µs) in this example and the inductor is calculated as below:

$$L_{N1} = \frac{\sqrt{2} \times V_{in\_rms} \times D_{on} \times T_s}{I_{sw\_pk}} = 510\,\mu H \quad (14)$$

Step 8: Determine the turns ratio N1:N2. In order to achieve energy channelling with only Q2, the following condition must be met:

$$\frac{N1}{N2} < \frac{V_{o1}}{V_{o2}} \quad (15)$$

In this design example, $V_{o1}$ swings from 43 V to 49 V (the average value is 46 V and ripple is +/3 V) while $V_{o2}$ swings from 7 V to 1 V (average value is 4 V and ripple is 3 V). The turns ratio N1:N2 should be designed lower than 43:7. N1:N2 is designed to be 5:1 in this example.

Step 9: Calculate the voltage and current stress for Q2. Trailing edge modulation is applied to produce GQ2 to reduce Q2 current stress. The maximum current for Q2 may be calculated as below:

$$I_{Q2\_max} = \sqrt{\frac{2 \times V_{o2\_max} \times I_{LED} \times T_s}{L_{N2}}} = 1.98A \quad (16)$$

$I_{LED}$ is the DC LED current, $L_{N2}$ is the inductance of winding N2. $V_{o2\_max}$=7 V, $I_{LED}$=0.2 A, $L_{N2}$=20.4 µH and Ts=28.5 µs are used in the above calculation. The max voltage on Q2, $V_{Q2\_max}$, may be calculated as:

$$V_{Q2\_max} = V_{o1\_max} \times \frac{N2}{N1} - V_{o2\_min} = 8.8V \quad (17)$$

Step 10: Verify whether the inductor works at DCM. The turn off time $T_{off1}$ and $T_{off2}$ may be calculated as:

$$T_{off1} = \frac{\left(I_{sw\_pk} - \frac{I_{Q2\_max} \times N_2}{N_1}\right) \times L_{N1}}{V_{o1\_min}} = 13.11\,\mu s \quad (18)$$

$$T_{off2} = \frac{I_{Q2\_max} \times L_{N2}}{V_{o1\_max}} = 5.72\,\mu s \quad (19)$$

$T_{off1}$ is the period of time that D1 is conducting, $T_{off2}$ is the period of time that D2/Q2 is conducting. The sum of $T_{on}$, $T_{off1}$ and $T_{off2}$ is $$T_{on} + T_{off1} + T_{off2} = 24.81\,\mu s \quad (20)$$

The sum of $T_{on}$, $T_{off1}$, and $T_{off2}$ is less than a switching period Ts=28.5 us. This verifies that the inductor still operates at DCM condition and the above calculated result is valid.

Step 11: Calculate the RMS current of Q2.

$$I_{Q2\_rms} = I_{Q2\_max} \sqrt{\frac{\left(\frac{T_{off2}}{T_2}\right)}{3}} = 0.51A \quad (21)$$

This shows that the RMS current of Q2 is still low so that the conduction loss of Q2 is also low.
Further overall optimization may be achieved by following the general practice of designing a comparable conventional converter.

EXAMPLE 2

In Example 1, the peak current in Q2 is high compared to the average current being delivered (peak current in Q2 is 1.98 A while the average current in Q2 is 0.2 A). By reducing turns ratio N1:N2, the current stress of Q2 can be reduced. In this example, the steps to design a buck-boost converter with reduced current stress for Q2 are shown.
Step 1: Repeat Step 1 to Step 6 in Example 1.
Step 2: Change turns ratio N1:N2 to 2.
Step 3: Calculate peak current and peak voltage of Q2. The results are 0.79 A and 23.5 V.
Step 4: Verify whether the inductor works at DCM condition, The calculated $T_{off1}$ and $T_{off2}$ times are 13 µs and 14.4 µs, respectively. The sum of $T_{on}$, $T_{off1}$ and $T_{off2}$ exceeds $T_s$, which means the inductor does not work at DCM condition. In Example 1, $T_{off2}$ is 5.77 µs and it has been substantially increased to 14.4 µs in this Example. Therefore, the calculated peak current of Q2 in step 3 is not valid. There are two ways to operate the inductor in DCM condition: (i) reduce switching frequency; and (ii) reduce the duty cycle. In the following design steps, both options have been used.
Step 5: Reduce the switching frequency to 20 KHz (Ts=50 µs) and the maximum duty cycle to 0.18.
Step 6: Calculate the inductance of winding NI, the result is 656 µH.
Step 7: Calculate the peak current and peak voltage of Q2. The results are 0.92 A and 23.5 V.
Step 8: Verify whether the inductor works under DCM condition. The calculated result of $T_{off1}$ and $T_{off2}$ are 15.6 µs and 21.6 µs. The sum of $T_{on}$, $T_{off1}$ and $T_{off2}$ is 46.2 µs and verifies that the inductor still works at DCM condition.

EXAMPLE 3

This example describes a design procedure for a flyback AC-DC converter (refer to the circuit of FIG. 5A) having a 90 Vrms to 135 Vrms input, and 100 W, 50 V, 2 A output.
Step 1. Design the auxiliary voltage based on 135 Vrms input:

$$V_{out} = V_{135\_min} = \sqrt{\frac{P_{o2\_mid} \times (V_{135\_rms})^2}{P_{out}}} = 38.2V \quad (22)$$

In the above calculation, $P_{o2\_mid}$ is 8 W (the average voltage of $V_{o2}$ is 4 V and $I_{LED}$ is 2 A). The calculated $V_{aux}$ is 38.2 V, which is enough to cover the input voltage range (90 Vrms to 135 Vrms).
Step 2: Calculate the output capacitor Co1 for main output $V_{o1}$ and the capacitor Co2 for ripple cancellation voltage $V_{o2}$. The way to determine Co1 and Co2 is the same as in Example 1. Co1 may be designed to be 960 µF to achieve 6

V peak-to-peak ripple voltage while $V_{o1}$ is averaged at 46 V. Two 470 μF electrolytic capacitors may be selected in a practical design. Co2 may be selected to be 20 μF since it is only used to filter high frequency ripple.

Step 3: Calculate RIMS input current and peak input current under 90 Vrms input.

$$I_{90\_rms} = \frac{P_{out}}{V_{90\_rms}} = 1.11A \quad (23)$$

$$I_{90\_pk} = \sqrt{2} \times I_{90,rms} = 1.57A \quad (24)$$

Step 4: Determine turns ratio Npri:Nsec1. Conventional flyback converter design procedure may be used to design turns ratio Npri:Nsec1. Npri:Nsec1 is set at 3:2 in this example.

Step 5: Calculate the duty cycle when the rectified input voltage reaches peak value under 90 Vrms input.

$$\frac{D}{1-D} = \frac{V_o}{V_{90\_pk} \times \frac{N_{sec1}}{N_{pri}}} \quad (25)$$

The duty cycle is calculated to be 0.368.

Step 6: Calculate the DC value of switching current at the primary side when the input voltage reaches peak value.

$$I_{90\_sw\_dc} = \frac{I_{90\_pk}}{D} = 4.26A \quad (26)$$

Step 7: Define the tipple of switching current to be 8% of its DC value:

$$I_{90\_sw\_rip} = I_{90\_sw\_dc} \times 8\% = 0.348 \text{ A} \quad (27)$$

Step 8: Set the switching frequency to be 65 kHz.

Step 9: Calculate the inductance of primary side winding Npri as follows:

$$L_{pri} = \frac{V_{90\_pk} \times T_s \times D}{I_{90\_sw\_rip}} = 2.11 \text{ mH} \quad (28)$$

Step 10: Calculate the current stress for Q2 when ignoring the ripple of switching current.

$$I_{Q2\_max} = I_{90\_sw\_dc} \times \frac{N_{pri}}{N_{sec1}} \times \frac{N_{sec1}}{N_{sec2}} \quad (29)$$

Nsec1: Nsec 2 is designed to be 1.5 and the calculated current stress for Q2 is 9.58 A.

Step 11: Calculate and the voltage stress for Q2. The result is 31 V.

EXAMPLE 4

To verify the buck-boost implementation, an 8.5 W, 50 V/0.17 a prototype was simulated (PSIM version 9.1.3, Powersim Inc., Rockville, Md.), and built and tested. The circuit is shown in FIG. 8 and Table 1 shows critical circuit parameters of the buck-boost prototype.

TABLE 1

| Critical circuit parameters of the buck-boost prototype | |
|---|---|
| Input voltage range | 100-240 V ac, rms |
| LED voltage | ~50 V |
| LED current | 0.7 A |
| Output $V_{o1}$ | ~45 VDC ± 1.5 Vrip |
| Output capacitor ($V_{o1}$) | 130 μF |
| Output $V_{o2}$ | ~5 VDC ± 1.5 Vrip |
| Output capacitor ($V_{o2}$) | 20 μF |
| Switching frequency | 20 KHz |
| Winding N1 Inductance | 800 μH |
| Winding N2 Inductance | 50 μH |
| Main MOSFET Q1 | STP3NK80Z |
| MOSFET Q2 | NTD4906N |

Figure 46:
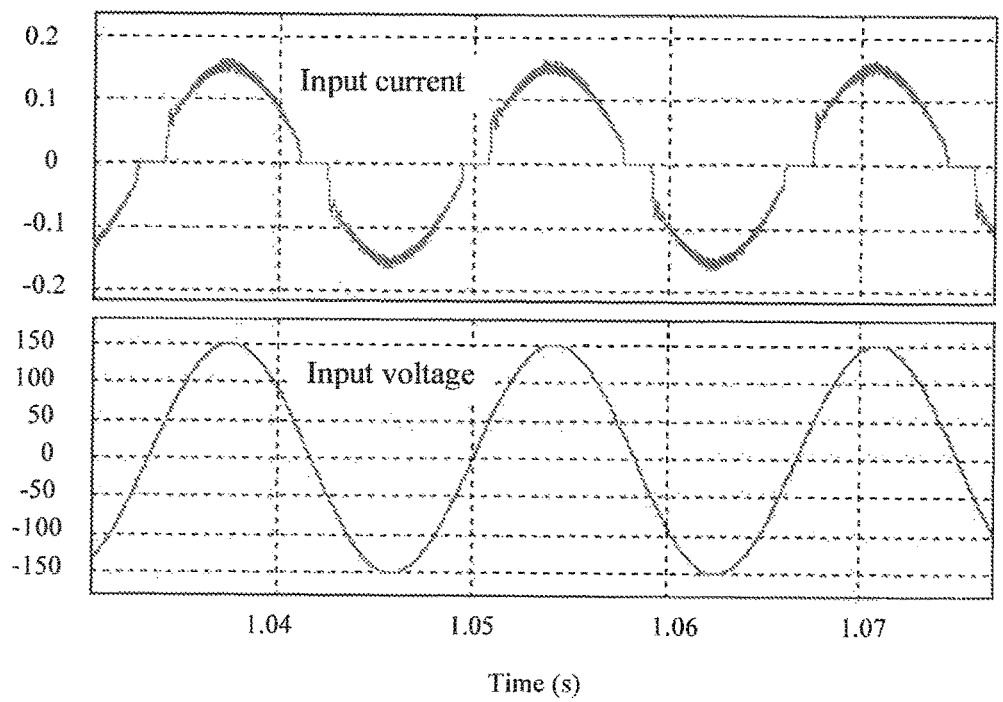
FIG. 46 shows AC input voltage and current waveforms for a simulation of a flyback implementation.

FIG. 46 shows the simulated AC input voltage and AC input current waveforms. As previous discussed, when the input voltage is lower than the auxiliary voltage $V_{aux}$, the bridge rectifier is reverse biased and there is no input current flow from the AC source. The simulated power factor under this condition is 0.97.

Figure 47:
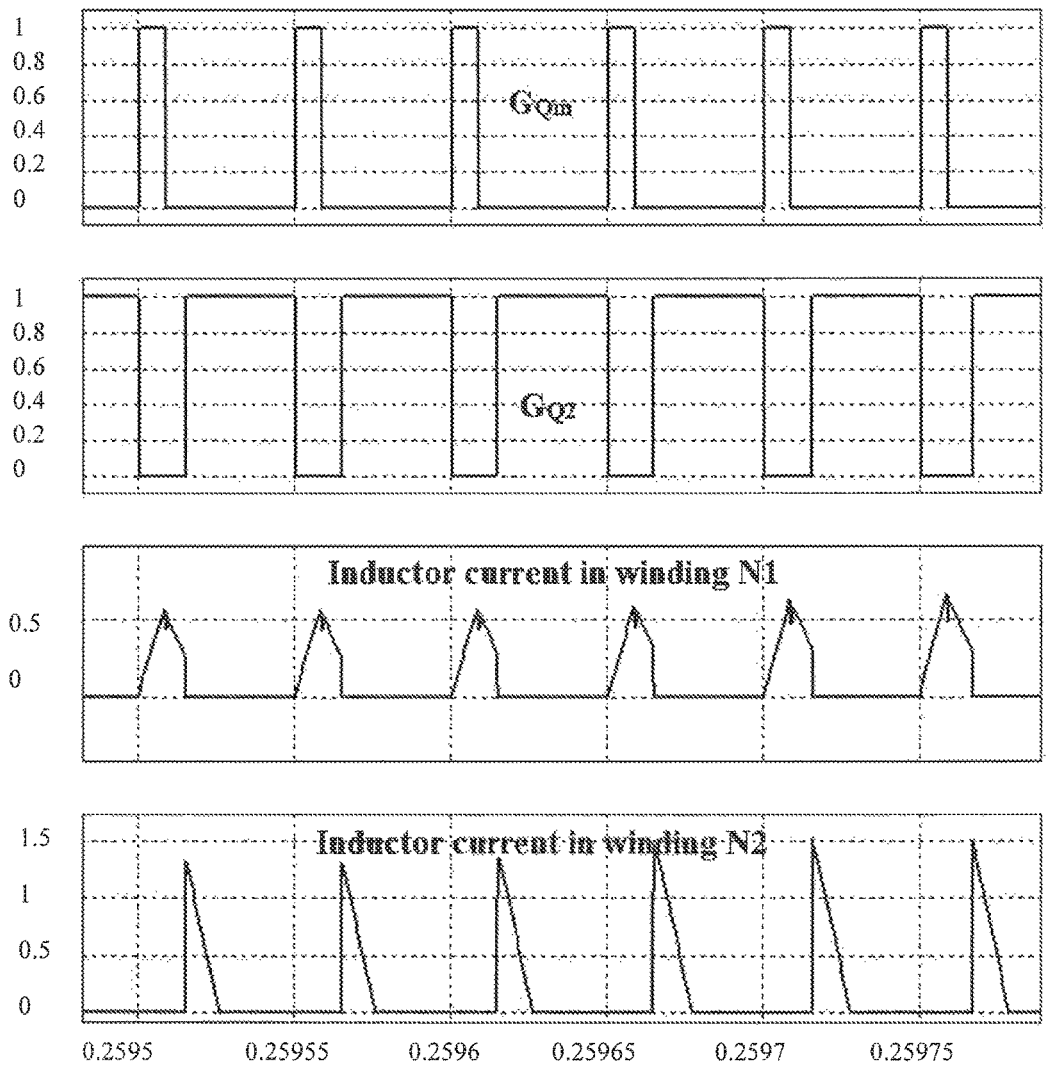
FIG. 47 shows critical switching waveforms for a simulation of a flyback implementation.

FIG. 47 shows the simulated critical switching waveforms. The gate drive signals $G_{Qm}$ and $G_{Q2}$ as well as the inductor current in winding N1 and winding N2 are presented to illustrate the energy channelling method. (Philip, the thrid waveform, inductor current i winding N1 cannot be seen clearly. Philip: The waveforms have been updated with heavier line)

Figure 48:
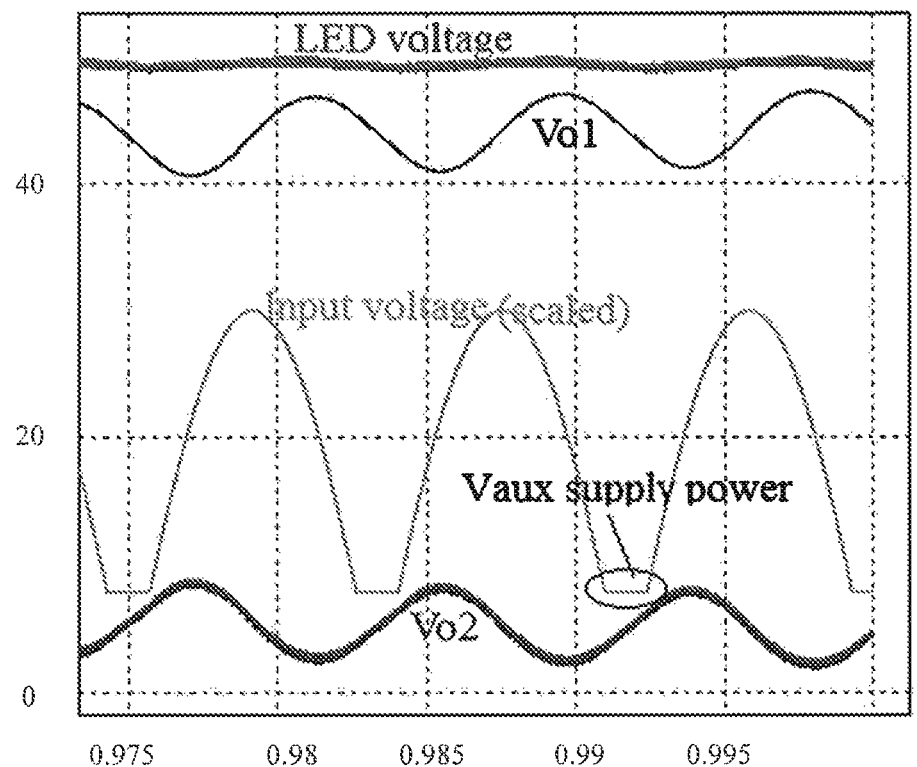
FIG. 48 shows rectified input voltage and output voltage waveforms for a simulation of a flyback implementation.

FIG. 48 shows the simulated input and output voltage waveforms. The input voltage shown is after the bridge rectifier and has been scaled down to facilitate better viewing, The after rectifier input voltage is clamped at $V_{aux}$ when the AC input voltage is smaller than $V_{aux}$. The low frequency ripple voltages from $V_{o1}$ and $V_{o2}$ are opposite in value to achieve cancellation. Their sum the LED voltage is a DC value and therefore a DC LED current is achieved.

Figure 49:
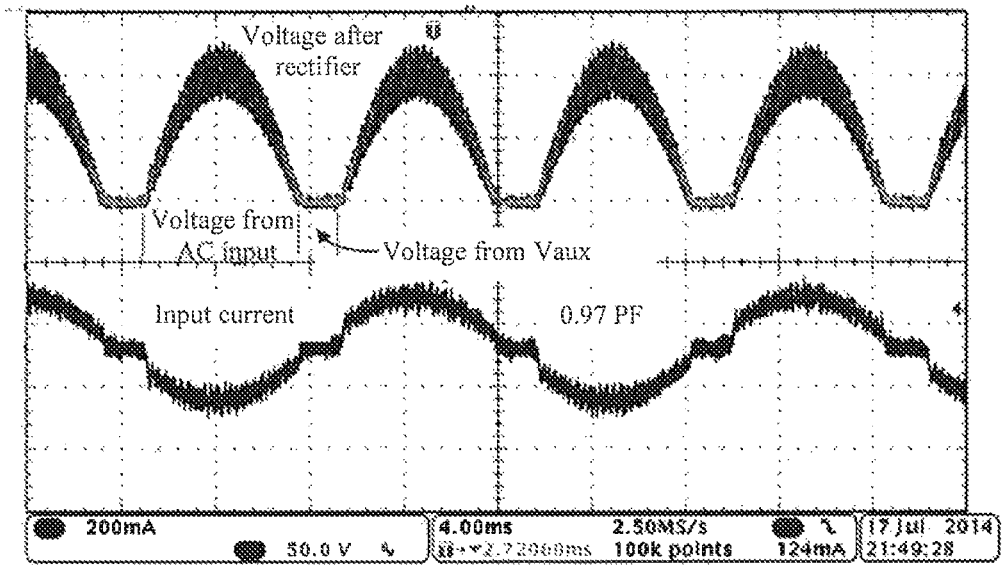
FIG. 49 shows input current versus after rectifier input voltage waveforms for a simulation of a flyback implementation.

FIG. 49 shows the measured input current waveform versus the after rectifier input voltage. $V_{aux}$ is set at 40 V and serves as the input energy source when the AC voltage is close to zero. At the same time, the input rectifier is reversely biased and there is no current coming from the AC source. The measured power factor is 0.97.

Figure 50:
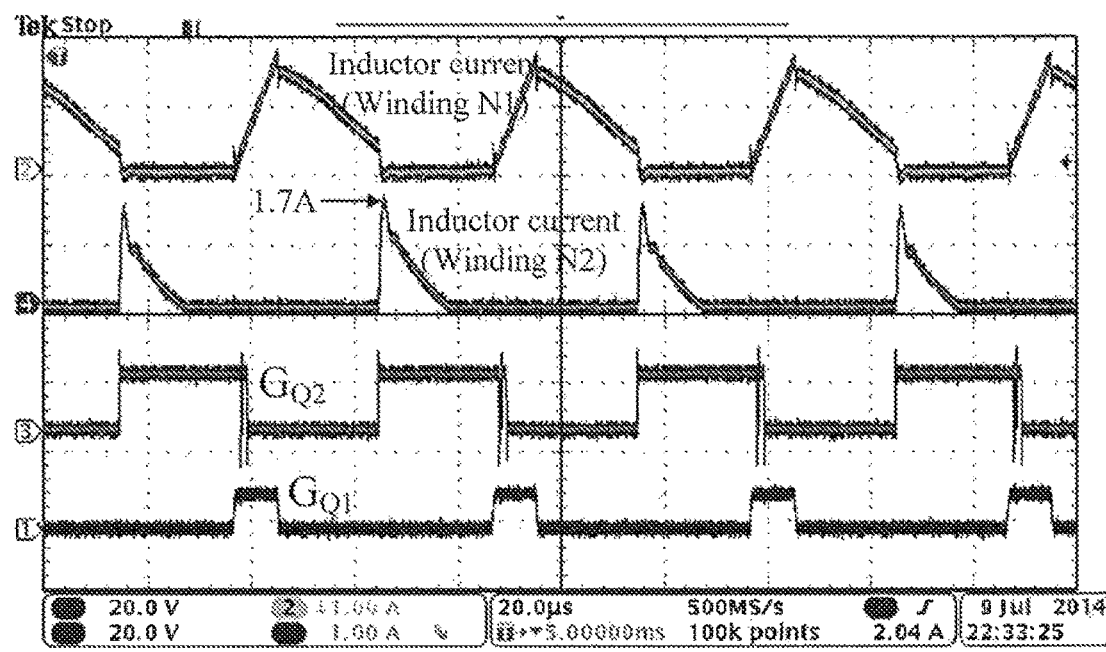
FIG. 50 shows critical inductor current and gate driving waveforms for a simulation of a flyback implementation.

FIG. 50 shows the measured inductor current and the gate driving waveforms. Leading edge modulation is applied to produce gate drive $G_{Q2}$ for Q2.

Figure 51A:
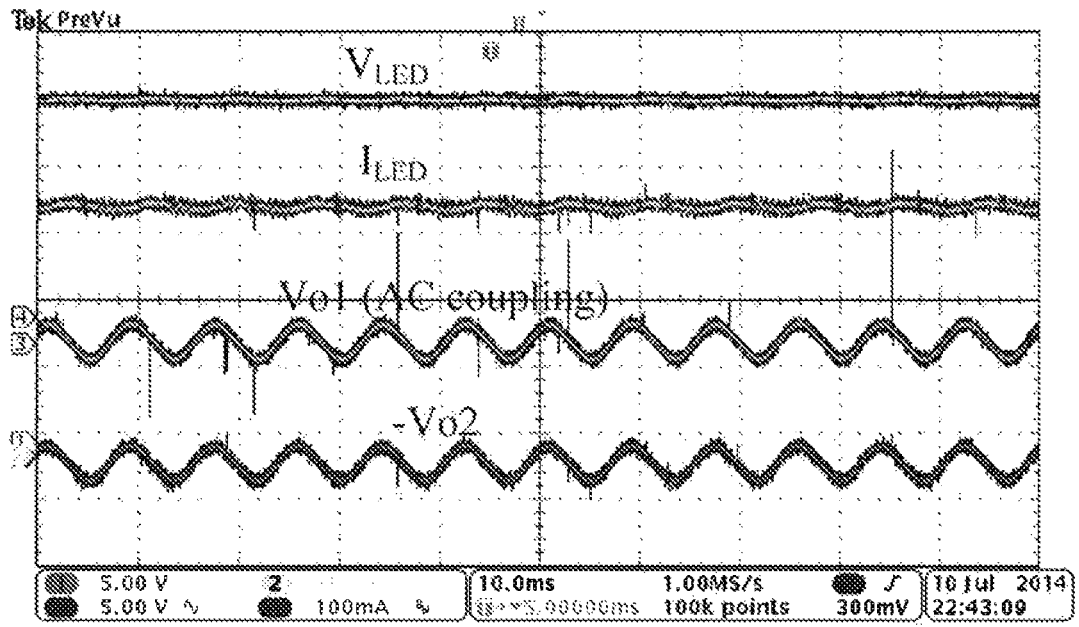
FIGS. 51A and 51B show simulated LED driving performance of the energy channelling flyback implementation of Example 4 and a conventional single-stage LED driver, respectively.
Figure 51B:
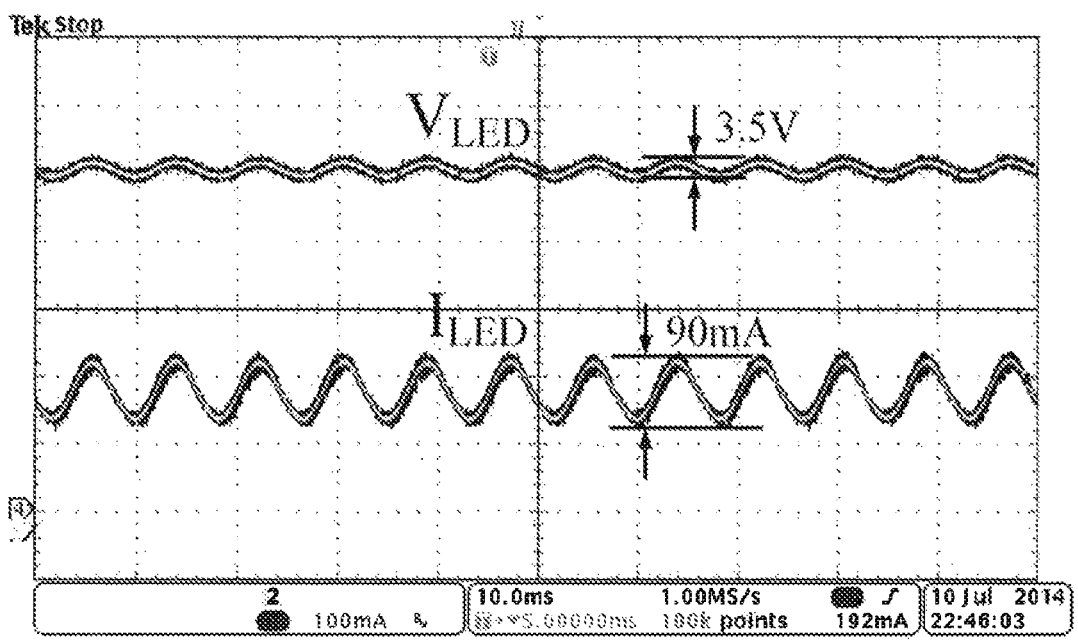

FIGS. 51A and 51B show a measured performance comparison between two technologies. In FIG. 51A, ripple cancellation is clearly shown with the proposed buck-boost LED driver, with a substantially DC LED voltage and DC LED current. In FIG. 51B, a conventional single staire LED driver produces 3.5 V pk-pk ripple voltage and 90 mA LED ripple current (53% of its DC value).

EXAMPLE 5

In this example, the operation of the power circuit of a buck-boost implementation (e.g., FIG. 8) will be described.

Figure 52:
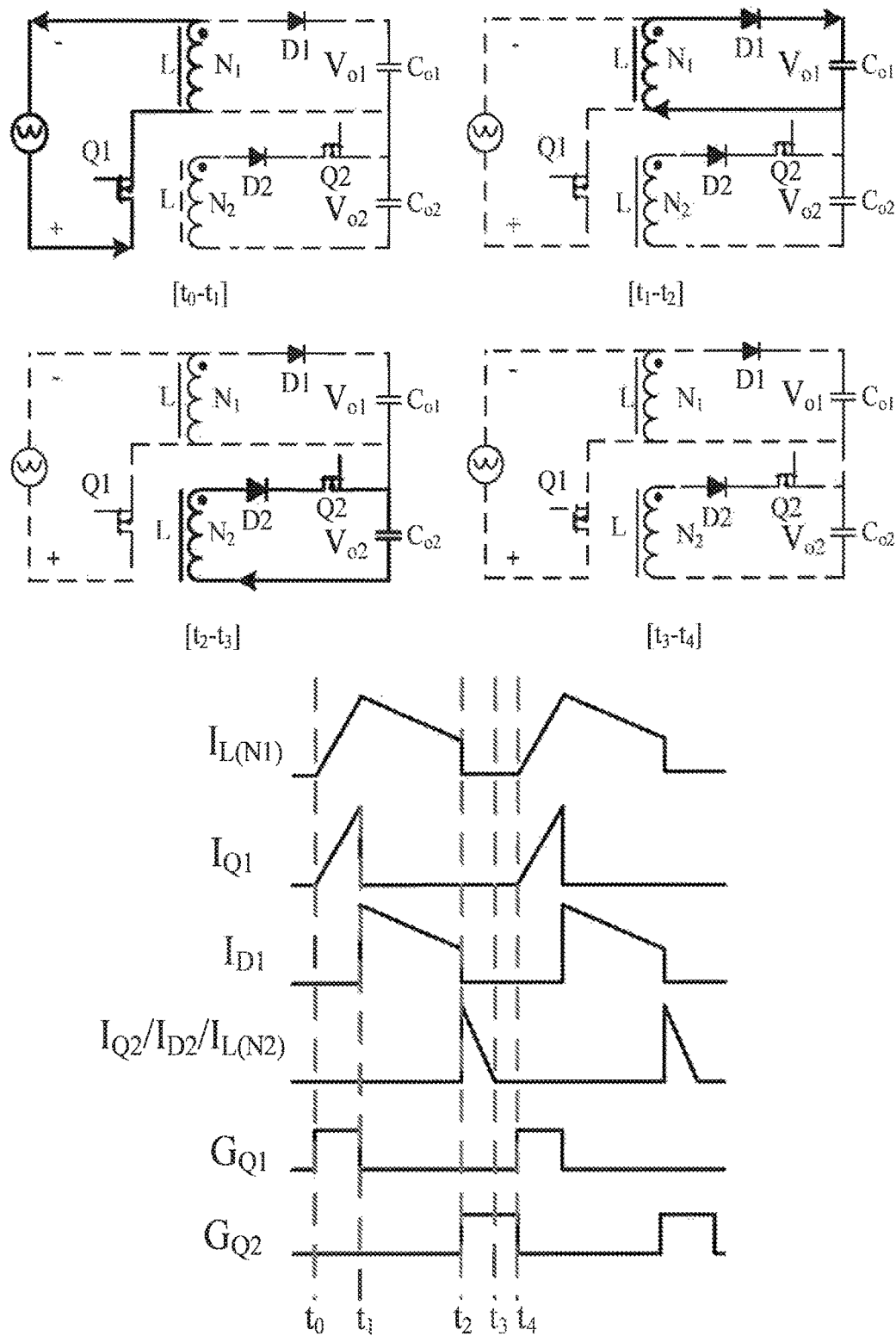
FIG. 52 shows the operating principle and key waveforms of a buck-boost implementation of an energy-channelling power converter according to one embodiment.

FIG. 52 shows the operating principle of the power circuit of the buck-boost LED driver and key waveforms when operating at DCM.

Q1 is turned on at time $t_0$. The inductor L is charged through winding N1 and both D1 and D2 are off. The state of Q2 doesn't influence the circuit. The inductor current $I_{L(N1)}$ starts increasing from zero. After a fixed turn on time, Q1 is turned off at $t_1$. Immediately after Q1 is turned off, Q2 remains off. The inductor current keeps circulating through D1. The inductor is discharged in [$t_1$–$t_2$] and the inductor energy is transferred to $V_{o1}$. Q2 is turned on at $t_2$ and the inductor current commutes from winding N1 to winding N2. The remaining inductor energy only transfers to $V_{o2}$ after $t_2$. This is achieved as follows.

The turns ratio N1:N2 and the voltage ratio $V_{o1}:V_{o2}$ are deliberately mismatched. For example, $V_{o1}$ is regulated at 45 V and $V_{o2}$ is regulated at 5 V ($V_{o1}:V_{o2}$=9:1). The turns ratio N1:N2 is made to be 8:2. When Q2 is on, the voltage across winding N2 is 5 V and the voltage across winding N1 is 20 V. Therefore, D1 is reverse biased and the inductor current only circulates through D2 and Q2 when Q2 is on.

The inductor current continues decreasing and becomes zero at time t3. A new switching cycle doesn't start until t4 to ensure DCM operation.

FIG. 52 also clearly demonstrates that the embodiment achieves a single stage power conversion. From $[t_0-t_1]$, the inductor is charged once. During $[t_1-t_2]$, the inductor is discharged and a first portion of its energy is transferred to $V_{o1}$. During. $[t_2-t_3]$, the inductor is continually discharged and transfers the remaining portion of its energy to $V_{o2}$. In one switching cycle, the inductor only experiences one charging and one discharging while transferring the power from the input to the output. Therefore, the driver achieves true single stage power conversion.

Control of the driver may be implemented, for example, as described above with reference to FIGS. 33 and 34.

Equivalents

Those skilled in the art will recognize or be able to ascertain variants of the embodiments described herein. Such variants are within the scope of the invention and are covered by the appended claims,

The invention claimed is:

1. A converter that converts AC input into DC output power, comprising:
an input circuit that receives AC input power, the input circuit having one or more power switching device;
a first output circuit that receives power from the input circuit and provides a first output comprising a DC voltage with a first AC voltage ripple or a DC current with a first AC current ripple;
a second output circuit that receives power from the input circuit and provides a second output comprising a second AC voltage ripple or a second AC current ripple, the second output circuit having one or more power switching device;
a controller that controls the power switching devices of the input circuit and the second output circuit so that the first output circuit and the second output circuit alternatively rectify output current only once during one switching cycle of the power switching devices;
wherein the first output and the second output are connected together (i) in series, such that the first AC voltage ripple is substantially cancelled, or (ii) in parallel, such that the first AC current ripple is substantially cancelled;
wherein substantially ripple-free DC output power is provided.

2. The converter of claim 1, further comprising at least one magnetic energy storage device, wherein:
the controller controls the power switching devices so that energy from the magnetic energy storage device is divided between the first and second output circuits, such that:
the first output circuit receives power released from the magnetic energy storage device during a part of the switching cycle, and the second output circuit receives power released from the magnetic energy storage device during a different part of the switching cycle.

3. The converter of claim 1, wherein the converter comprises a flyback converter, a buck-boost converter, a non-isolated boost converter, or LCLC resonant converter.

4. The converter of claim 2, wherein:
the at least one magnetic energy storage device comprises a transformer;
the first output circuit includes a first secondary transformer winding Nsec1 and provides a first output voltage Vo1;
the second output circuit includes a second secondary transformer winding Nsec2 and provides a second output voltage Vo2;
a turns ratio of the first and second secondary transformer windings Nsec1:Nsec2 is less than a ratio of the first and second output voltages Vo1:Vo2.

5. The converter of claim 2, wherein:
the at least one magnetic energy storage device comprises an inductor;
the first output circuit includes a first inductor winding N1 and provides a first output voltage Vo1;
the second output circuit includes a second inductor winding N2 and provides a second output voltage Vo2;
a turns ratio of the first and second inductor windings N1:N2 is less than the ratio of the first and second output voltages Vo1:Vo2.

6. The converter of claim 1, further comprising an auxiliary power supply that provides input power that maintains the second output when the AC input power falls below a threshold value.

7. The converter of claim 6, further comprising an auxiliary power supply comprising an auxiliary winding of the magnetic energy storage device that provides input power that maintains the second output when the AC input power falls below a threshold value.

8. The converter of claim 1, wherein the controller controls the one or more power switching device of the input circuit so that the input circuit achieves a high power factor.

9. A method of converting AC input into DC output power, comprising:
receiving AC input power using an input circuit having one or more power switching device;
using a first output circuit to receive power from the input circuit and provide a first output comprising a DC voltage with a first AC voltage ripple or a DC current with a first AC current ripple;
using a second output circuit to receive power from the input circuit and provide a second output comprising a second AC voltage ripple or a second AC current ripple, the second output circuit having one or more power switching device;
controlling the power switching devices of the input circuit and the second output circuit so that the first output circuit and the second output circuit alternatively rectify output current only once during one switching cycle of the power switching devices;
wherein the first output and the second output are connected together (i) in series, such that the first AC voltage ripple is substantially cancelled, or (ii) in parallel, such that the first AC current ripple is substantially cancelled;
wherein substantially ripple-free DC output power is provided.

10. The method of claim 9, comprising:
using at least one magnetic energy storage device;
controlling the power switching devices so that energy from the magnetic energy storage device is divided between the first and second output circuits, such that:
the first output circuit receives power released from the magnetic energy storage device during a part of the switching cycle, and the second output circuit receives power released from the magnetic energy storage device during a different part of the switching cycle.

11. The method of claim 9, including using a power converter comprising a flyback converter, a buck-boost converter, a non-isolated boost converter, or a LCLC resonant converter.

12. The method of claim 10, comprising:
using a transformer for the at least one magnetic energy storage device, wherein:
the first output circuit includes a first secondary transformer winding Nsec1 and provides a first output voltage Vo1;
the second output circuit includes a second secondary transformer winding Nsec2 and provides a second output voltage Vo1; and
selecting a turns ratio of the first and second secondary transformer windings Nsec1:Nsec2 to be less than a ratio of the first and second output voltages Vo1:Vo2.

13. The method of claim 10, comprising:
using an inductor for the at least one magnetic energy storage device, wherein:
the first output circuit includes a first inductor winding N1 and provides a first output voltage Vo1;
the second output circuit includes a second inductor winding N2 and provides a second output voltage Vo2; and
selecting a turns ratio of the first and second inductor windings N1:N2 to be less than the ratio of the first and second output voltages Vo1:Vo2.

14. The method of claim 9, further comprising providing auxiliary input power that maintains the second output when the AC input power falls below a threshold value.

15. The method of claim 10, further comprising using an auxiliary winding of the magnetic energy storage device to provide auxiliary input power that maintains the second output when the AC input power falls below a threshold value.

16. The method of claim 14, including setting a value of an auxiliary input voltage to be equal to a threshold input voltage.

17. The method of claim 9, further comprising controlling an input circuit current so that instantaneous input power is equal to or greater than output power of the second output.

18. The method of claim 9, comprising controlling the one or more power switching device of the input circuit so that the input circuit achieves a high power factor.

19. A controller for a power converter that converts AC input into DC output power, wherein the power converter comprises:
an input circuit that receives AC input power, the input circuit having one or more power switching device;
a first output circuit that receives power from the input circuit and provides a first output comprising a DC voltage with a first AC voltage ripple or a DC current with a first AC current ripple;
a second output circuit that receives power from the input circuit and provides a second output comprising a second AC voltage ripple or a second AC current ripple, the second output circuit having one or more power switching device;
wherein the controller comprises:
a circuit that receives a sensed low frequency ripple of the first output and produces a reference signal having a ripple opposite in phase to the low frequency ripple;
a comparator that uses the reference signal to produce a switching signal for the one or more switches of the second output circuit;
a circuit that produces a switching signal for the one or more power switching device of the input circuit, such that timing of switching of the power switching devices of the input circuit and the second output circuit result in the first output circuit and the second output circuit alternatively rectifying output current only once during one switching cycle of the power switching devices;
wherein substantially ripple-free DC output power is provided when the first output and the second output are connected together (i) in series, such that the first AC voltage ripple is substantially cancelled, or (ii) in parallel, such that the first AC current ripple is substantially cancelled.

* * * * *